(12) United States Patent
Howell et al.

(10) Patent No.: US 7,760,898 B2
(45) Date of Patent: Jul. 20, 2010

(54) EYEGLASSES WITH HEARING ENHANCED AND OTHER AUDIO SIGNAL-GENERATING CAPABILITIES

(75) Inventors: Thomas A. Howell, Palo Alto, CA (US); David Chao, Saratoga, CA (US); C. Douglass Thomas, Campbell, CA (US); Peter P. Tong, Mountain View, CA (US)

(73) Assignee: IP Venture, Inc., Los Altos, CA (US)

( * ) Notice: Subject to any disclaimer, the term of this patent is extended or adjusted under 35 U.S.C. 154(b) by 1113 days.

(21) Appl. No.: 11/183,262

(22) Filed: Jul. 15, 2005

(65) Prior Publication Data

US 2005/0248717 A1    Nov. 10, 2005

Related U.S. Application Data

(63) Continuation-in-part of application No. 10/964,011, filed on Oct. 12, 2004, now Pat. No. 7,192,136.

(60) Provisional application No. 60/509,631, filed on Oct. 9, 2003, provisional application No. 60/527,565, filed on Dec. 8, 2003, provisional application No. 60/562,798, filed on Apr. 15, 2004, provisional application No. 60/583,169, filed on Jun. 26, 2004, provisional application No. 60/592,045, filed on Jul. 28, 2004, provisional application No. 60/605,191, filed on Aug. 28, 2004, provisional application No. 60/592,045, filed on Jul. 28, 2004, provisional application No. 60/605,191, filed on Aug. 28, 2004, provisional application No. 60/618,107, filed on Oct. 12, 2004, provisional application No. 60/620,238, filed on Oct. 18, 2004, provisional application No. 60/647,836, filed on Jan. 31, 2005, provisional application No. 60/647,826, filed on Jan. 31, 2005.

(51) Int. Cl.
*H04R 25/00* (2006.01)

(52) U.S. Cl. .................. 381/327; 381/322; 381/330; 381/381

(58) Field of Classification Search ............. 381/23.1, 381/122, 324, 327, 334, 338, 355, 374, 375, 381/376, 377, 381, 383, 387; 181/129; 379/52; 455/556.1, 569.1, 575.2, 575.3, 575.6
See application file for complete search history.

(56) References Cited

U.S. PATENT DOCUMENTS

| 320,558 | A | 6/1885 | Hull |
| 669,949 | A | 3/1901 | Underwood |

(Continued)

FOREIGN PATENT DOCUMENTS

CN    88203065    11/1988

(Continued)

OTHER PUBLICATIONS

"±1.5g Dual Axis Micromachined Accelerometer", Freescale Semiconductor, Inc., Motorola Semiconductor Technical Data, MMA6260Q, 2004, pp. 1-7.

(Continued)

*Primary Examiner*—Curtis Kuntz
*Assistant Examiner*—Jesse A Elbin

(57) ABSTRACT

Novel techniques for hearing enhancement based on a pair of glasses are disclosed. In one embodiment, the glasses include a first lens holder, a second lens holder, a bridge element, a first temple, a second temple, a first speaker, a second speaker, a microphone and at least one electrical component that performs a hearing enhanced function to enhance audio signals from the microphone to be sent to the speakers for the user to hear. At least one electrical component in the glasses is for generating other audio signals by the speakers, with the other audio signals originating from signals other than audio signals captured by the microphone. In another embodiment, some of the electrical components are in a portable device, wired or wirelessly, coupled to the glasses. In yet another embodiment, the glasses function as a headset, with other electrical components in the portable device. In such embodiment, since the glasses can provide a number of different hearing functions, a third party may not be able to tell whether the user is wearing the glasses to have his hearing enhanced, or for hearing other audio signals.

20 Claims, 26 Drawing Sheets

U.S. PATENT DOCUMENTS

| | | | |
|---|---|---|---|
| 1,255,265 A | 2/1918 | Zachara | |
| 1,917,745 A | 7/1933 | Weiss | |
| 2,249,572 A | 7/1941 | Lieber | |
| 2,638,532 A | 5/1953 | Brady | |
| 2,794,085 A * | 5/1957 | De Angelis | 381/327 |
| 2,818,511 A | 12/1957 | Ullery et al. | |
| 2,830,132 A * | 4/1958 | Borg | 381/327 |
| 2,904,670 A | 9/1959 | Calmes | |
| 3,060,308 A | 10/1962 | Fortuna | |
| 3,597,054 A | 8/1971 | Winter | |
| 3,710,115 A | 1/1973 | Jubb | |
| 4,165,487 A | 8/1979 | Corderman | |
| 4,254,451 A | 3/1981 | Cochran, Jr. | |
| 4,283,127 A | 8/1981 | Rosenwinkel et al. | |
| 4,322,585 A | 3/1982 | Liautaud | |
| 4,348,664 A | 9/1982 | Boschetti et al. | |
| 4,389,217 A | 6/1983 | Baughman et al. | |
| 4,526,473 A | 7/1985 | Zahn, III | |
| 4,535,244 A | 8/1985 | Burnham | |
| 4,608,492 A | 8/1986 | Burnham | |
| 4,683,587 A | 7/1987 | Silverman | |
| 4,751,691 A | 6/1988 | Perera | |
| 4,757,714 A | 7/1988 | Purdy et al. | |
| 4,773,095 A | 9/1988 | Zwicker et al. | |
| 4,806,011 A | 2/1989 | Bettinger | |
| 4,822,160 A | 4/1989 | Tsai | |
| 4,822,161 A | 4/1989 | Jimmy | |
| 4,851,686 A | 7/1989 | Pearson | |
| 4,942,629 A | 7/1990 | Stadlmann | |
| 4,962,469 A | 10/1990 | Ono et al. | |
| 4,985,632 A | 1/1991 | Bianco et al. | |
| 5,008,548 A | 4/1991 | Gat | |
| 5,020,150 A | 5/1991 | Shannon | |
| 5,036,311 A | 7/1991 | Moran et al. | |
| 5,050,150 A | 9/1991 | Ikeda | |
| 5,093,576 A | 3/1992 | Edmond et al. | |
| 5,148,023 A | 9/1992 | Hayashi et al. | |
| 5,151,600 A | 9/1992 | Black | |
| 5,161,250 A | 11/1992 | Ianna et al. | |
| 5,172,256 A | 12/1992 | Sethofer et al. | |
| 5,306,917 A | 4/1994 | Black et al. | |
| 5,353,378 A | 10/1994 | Hoffman et al. | |
| 5,359,370 A | 10/1994 | Mugnier | |
| 5,367,345 A | 11/1994 | da Silva | |
| 5,379,464 A | 1/1995 | Schleger et al. | |
| 5,382,986 A | 1/1995 | Black et al. | |
| 5,394,005 A | 2/1995 | Brown et al. | |
| 5,452,480 A | 9/1995 | Ryden | |
| 5,455,640 A | 10/1995 | Gertsikov | |
| 5,457,751 A | 10/1995 | Such | |
| 5,500,532 A | 3/1996 | Kozicki | |
| D369,167 S | 4/1996 | Hanson et al. | |
| 5,510,961 A | 4/1996 | Peng | |
| 5,513,384 A | 4/1996 | Brennan et al. | |
| 5,533,130 A | 7/1996 | Staton | |
| 5,581,090 A | 12/1996 | Goudjil | |
| 5,585,871 A | 12/1996 | Linden | |
| 5,589,398 A | 12/1996 | Krause et al. | |
| 5,590,417 A | 12/1996 | Rydbeck | |
| 5,608,808 A | 3/1997 | da Silva | |
| 5,634,201 A | 5/1997 | Mooring | |
| 5,686,727 A | 11/1997 | Reenstra et al. | |
| 5,715,323 A | 2/1998 | Walker | |
| 5,737,436 A | 4/1998 | Boyden et al. | |
| 5,900,720 A | 5/1999 | Kallman et al. | |
| 5,941,837 A | 8/1999 | Amano et al. | |
| 5,946,071 A | 8/1999 | Feldman | |
| 5,966,746 A | 10/1999 | Reedy et al. | |
| 5,980,037 A | 11/1999 | Conway | |
| 5,988,812 A | 11/1999 | Wingate | |
| 5,992,996 A | 11/1999 | Sawyer | |
| 5,995,592 A | 11/1999 | Shirai et al. | |
| 6,010,216 A | 1/2000 | Jesiek | |
| 6,013,919 A | 1/2000 | Schneider et al. | |
| 6,028,627 A | 2/2000 | Helmsderfer | |
| 6,046,455 A | 4/2000 | Ribi et al. | |
| 6,060,321 A | 5/2000 | Hovorka | |
| 6,061,580 A | 5/2000 | Altschul et al. | |
| 6,091,546 A | 7/2000 | Spitzer | |
| 6,091,832 A | 7/2000 | Shurman et al. | |
| 6,115,177 A | 9/2000 | Vossler | |
| 6,132,681 A | 10/2000 | Faran et al. | |
| 6,154,552 A | 11/2000 | Koroljow et al. | |
| 6,176,576 B1 | 1/2001 | Green et al. | |
| 6,225,897 B1 | 5/2001 | Doyle et al. | |
| 6,231,181 B1 | 5/2001 | Swab | |
| 6,236,969 B1 | 5/2001 | Ruppert et al. | |
| 6,243,578 B1 | 6/2001 | Koike | |
| 6,259,367 B1 | 7/2001 | Klein | |
| 6,270,466 B1 | 8/2001 | Weinstein et al. | |
| 6,292,213 B1 | 9/2001 | Jones | |
| 6,301,367 B1 | 10/2001 | Boyden et al. | |
| 6,307,526 B1 | 10/2001 | Mann | |
| 6,343,858 B1 | 2/2002 | Zelman | |
| 6,349,001 B1 | 2/2002 | Spitzer | |
| 6,349,422 B1 | 2/2002 | Schleger et al. | |
| 6,409,338 B1 | 6/2002 | Jewell | |
| 6,426,719 B1 | 7/2002 | Nagareda et al. | |
| 6,478,736 B1 | 11/2002 | Mault | |
| 6,506,142 B2 | 1/2003 | Itoh et al. | |
| 6,513,532 B2 | 2/2003 | Mault et al. | |
| 6,517,203 B1 | 2/2003 | Blum et al. | |
| 6,539,336 B1 | 3/2003 | Vock et al. | |
| 6,542,081 B2 | 4/2003 | Torch | |
| 6,546,101 B1 | 4/2003 | Murray et al. | |
| 6,554,763 B1 | 4/2003 | Amano et al. | |
| 6,619,799 B1 | 9/2003 | Blum et al. | |
| 6,629,076 B1 | 9/2003 | Haken | |
| 6,729,726 B2 | 5/2004 | Miller et al. | |
| 6,736,759 B1 | 5/2004 | Stubbs et al. | |
| 6,764,194 B1 | 7/2004 | Cooper | |
| 6,792,401 B1 | 9/2004 | Nigro et al. | |
| 6,912,386 B1 | 6/2005 | Himberg et al. | |
| 6,929,365 B2 | 8/2005 | Swab et al. | |
| 6,947,219 B1 | 9/2005 | Ou | |
| 7,013,009 B2 | 3/2006 | Warren | |
| 7,031,667 B2 | 4/2006 | Horiguchi | |
| 7,059,717 B2 | 6/2006 | Bloch | |
| 7,073,905 B2 | 7/2006 | Da Pra' | |
| 7,192,136 B2 | 3/2007 | Howell et al. | |
| 7,255,437 B2 | 8/2007 | Howell et al. | |
| 7,265,358 B2 | 9/2007 | Fontaine | |
| 7,274,292 B2 | 9/2007 | Velhal et al. | |
| 7,312,699 B2 | 12/2007 | Chornenky | |
| 7,331,666 B2 | 2/2008 | Swab et al. | |
| 7,429,965 B2 | 9/2008 | Weiner | |
| 2001/0005230 A1 | 6/2001 | Ishikawa | |
| 2002/0017997 A1 | 2/2002 | Felkowitz | |
| 2002/0081982 A1 | 6/2002 | Schwartz et al. | |
| 2002/0084990 A1 | 7/2002 | Peterson, III | |
| 2002/0089639 A1 | 7/2002 | Starner et al. | |
| 2002/0090103 A1 | 7/2002 | Calisto, Jr. | |
| 2002/0098877 A1 | 7/2002 | Glezerman | |
| 2002/0109600 A1 | 8/2002 | Mault et al. | |
| 2002/0140899 A1 | 10/2002 | Blum et al. | |
| 2002/0197961 A1 | 12/2002 | Warren | |
| 2003/0018274 A1 | 1/2003 | Takahashi et al. | |
| 2003/0022690 A1 * | 1/2003 | Beyda et al. | 455/556 |
| 2003/0032449 A1 | 2/2003 | Giobbi | |
| 2003/0062046 A1 | 4/2003 | Wiesmann | |
| 2003/0065257 A1 | 4/2003 | Mault et al. | |
| 2003/0067585 A1 | 4/2003 | Miller et al. | |
| 2003/0068057 A1 | 4/2003 | Miller et al. | |
| 2003/0083591 A1 * | 5/2003 | Edwards et al. | 600/559 |

| | | | |
|---|---|---|---|
| 2003/0226978 | A1 | 12/2003 | Ribi et al. |
| 2004/0000733 | A1 | 1/2004 | Swab et al. |
| 2004/0063378 | A1 | 4/2004 | Nelson |
| 2004/0096078 | A1 | 5/2004 | Lin |
| 2004/0100384 | A1 | 5/2004 | Chen et al. |
| 2004/0150986 | A1 | 8/2004 | Chang |
| 2004/0156012 | A1 | 8/2004 | Jannard et al. |
| 2004/0157649 | A1 | 8/2004 | Jannard et al. |
| 2004/0160571 | A1* | 8/2004 | Jannard et al. .............. 351/158 |
| 2004/0160572 | A1 | 8/2004 | Jannard |
| 2004/0160573 | A1 | 8/2004 | Jannard et al. |
| 2005/0067580 | A1 | 3/2005 | Fontaine |
| 2005/0213026 | A1 | 9/2005 | Da Pra' |
| 2005/0230596 | A1 | 10/2005 | Howell et al. |
| 2005/0248719 | A1 | 11/2005 | Howell et al. |
| 2005/0264752 | A1 | 12/2005 | Howell et al. |
| 2006/0001827 | A1 | 1/2006 | Howell et al. |
| 2006/0003803 | A1 | 1/2006 | Thomas et al. |
| 2006/0023158 | A1 | 2/2006 | Howell et al. |
| 2006/0107822 | A1 | 5/2006 | Bowen |
| 2006/0132382 | A1 | 6/2006 | Jannard |
| 2007/0030442 | A1 | 2/2007 | Howell et al. |
| 2007/0046887 | A1 | 3/2007 | Howell et al. |
| 2007/0098192 | A1* | 5/2007 | Sipkema .................... 381/312 |
| 2007/0109491 | A1 | 5/2007 | Howell et al. |
| 2007/0186330 | A1 | 8/2007 | Howell et al. |
| 2007/0208531 | A1 | 9/2007 | Darley et al. |
| 2007/0270663 | A1 | 11/2007 | Ng et al. |
| 2007/0271065 | A1 | 11/2007 | Gupta et al. |
| 2007/0271116 | A1 | 11/2007 | Wysocki et al. |
| 2007/0271387 | A1 | 11/2007 | Lydon et al. |
| 2008/0144854 | A1 | 6/2008 | Abreu |
| 2008/0262392 | A1 | 10/2008 | Ananny et al. |

FOREIGN PATENT DOCUMENTS

| | | |
|---|---|---|
| CN | 89214222.7 | 3/1990 |
| CN | 90208199.3 | 11/1990 |
| EP | 1134491 A2 | 9/2001 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 6/1998 |
| JP | 2000-039595 | 2/2000 |
| JP | 2002 341059 A | 11/2002 |
| TW | 484711 | 6/2001 |
| WO | WO 97/12205 A1 | 4/1997 |
| WO | WO 99/50706 | 10/1999 |
| WO | WO 02/06881 A2 | 1/2002 |
| WO | WO 03/069394 A1 | 8/2003 |
| WO | WO 03/100368 A1 | 12/2003 |
| WO | WO 2004/012477 A2 | 2/2004 |
| WO | WO 2004/025554 A1 | 3/2004 |

OTHER PUBLICATIONS

"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Eyetop", Product-Features, eyetop eyewear, eyetop belt worn, http://www.eyetop.net/products/eyetop/features.asp., downloaded Nov. 6, 2003, pp. 1-2.
"Exclusive Media Event Marks Debut of Oakley Thump: World's First Digital Audio Eyewear", Oakley Investor Relations, Press Release, Nov. 15, 2004. pp. 1-2.
"Heart Rate Monitors", http://www.healthgoods.com, downloaded Dec. 4. 2004.
"How is the UV Index Calculated", SunWise Program, U.S. Environmental Protection Agency, http://www.epa.gov/sunwise/uvcalc. html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses-Cutting Edge RAZRWire Line Offers Consumers On-The-Go Connections", Motorola Mediacenter-Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.
"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV. html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Gripples?", Gripping Eyewear, Inc., http://www.grippingeyewear.com/whatare.html, downloaded Nov. 2, 2005.
"With Racing Heart", Skaloud et al, GPS World, Oct. 1, 2001, http://www.gpsworld.com/gpsworld/content/printContentPopup.isp?id=1805, pp. 1-5.
Abrisa Product Information: Commercial Hot Mirror, Abrisa, p. 1, (Jun. 1999).
Alps Spectable, Air Conduction Glass, Bone Conduction Glass, htt;://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Bone Conduction Headgear HG16 Series, "Voiceducer," http://www.temco-j.co.jp/html/English/HG16.html, downloaded Dec. 10, 2003, pp. 1-3.
Camoy, David, "The Ultimate MP3 Player for Athletes? Could be.", CNET Reviews, May 14, 2004, pp. 1-4.
Clifford, Michelle A., "Acccelerometers Jump Into the Consumer Goods Market", Sensors Online, http://www.sensorsmag.com, Aug. 2004.
Cool Last Minute Gift Ideas!, UltimateFatBurner Reviews and Articles, http://www.ultimatefatburner.com/gift-ideas.html, downloaded May 10, 2005, pp. 1-3.
Comfees.com, Adjustable Sports Band Style No. 1243. http://shop.store.yahoo.com/comfees/adsporbansty.html downloaded Apr. 18, 2003, pp. 1-2.
Global Solar UV Index, A Practical Guide, World Health Organization, 2002, pp. 1-28.
Grobart, Sam, "Digit-Sizing Your Computer Data", News Article, Sep. 2004, p. 1.
Life Monitor V1.1, Rhusoft Technologies Inc., http://www.rhusoft.com/lifemonitor/, Mar. 1, 2003, pp. 1-6.

Manes, Stephen, "Xtreme Cam", Forbes Magazine, Sep. 5, 2005, p. 96.

Mio, PhysiCal, http://www.gophysical.com/, downloaded Jan. 27, 2004, 5 pages.

Monitoring Athletes Performance—2002 Winter Olympic News from KSL, Jan. 23, 2002, http://2002.ksl.com/news-3885i.php, pp. 1-3.

Niwa, "UV Index Information", http://www.niwa.cri.nz/services/uvozone/uvi-info, downloaded Jul. 15, 2004, pp. 1-2.

Pedometer, Modell HJ-112, Omron Instruction Manual, Omron Healthcare, Inc., 2003, pp. 1-27.

PNY Announces Executive Attaché USB 2.0 Flash Drive and Pen Series, Press Release, PNY Technologies, Las Vegas, Jan. 8, 2004, pp. 1-2.

PNY Technologies, "Executive Attaché" http://www.pny.com/products/flash/execattache.asp downloaded Nov. 16, 2005.

Polar WM41 and 42 weight management monitor, http://www.simplysports/polar/weight_management/wm41-42.htm, downloaded Jan. 28, 2004, pp. 1-3.

Questions Answers, Pedometer.com, http:/www.pedometer.com, downloaded May 5, 2005.

RazrWire, Motorola, 2005, 1 page.

SafeSun Personal UV Meter, Scientific Data, Optix Tech Inc., http://www.safesun.com/scientific.html, downloaded May 1, 2003, pp. 1-3.

SafeSun, Personal UV Meter, "Technical Specifications", Optix Tech Inc., http://www.safesun.com/technical.html, downloaded Jul. 12, 2004, pp. 1-2.

SafeSun, Personal UV Meter, Experiments, Optix Tech Inc., http://www.safesun.com/experiments.html, downloaded Feb. 5, 2004, pp. 1-2.

Shades of Fun, Blinking Light Glasses, http://www.shadesoffun.com/Nov/Novpgs-14.html, downloaded Jul. 9, 2005, pp. 1-4.

SportLine Fitness Pedometer-Model 360, UltimateFatBurner Superstore, http://www.ultimatefatburner-store.com/ac_004.html, downloaded May 10, 2005, pp. 1-2.

Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.

Stevens, Kathy, "Should I Use a Pedometer When I Walk?", Healtheon/WebMD, Apr. 14, 2000.

Sundgot, Jørgen "2nd-gen Motorola Bluetooth headset", InfoSync World, Mar. 1, 2003, http://www.infosync.no/news/2002/n/2841.html, pp. 1-2.

SunSensors, Segan Industries, Inc., http://www.segan-ind.com/sunsensor.htm, downloaded Feb. 5, 2004, pp. 1-3.

Sun UV™, Personal UV Monitor, APA Optics, Inc., http://www.apaoptics.com/sunuv/models.html, downloaded Dec. 20, 2003.

SunUV™, Personal UV Monitor User's Guide, APA Optics, Inc., 2003 pp. 1-52.

Top Silicon PiN Photodiode, PD93-21C, Technical Data Sheet, Everlight Electronics Co., Ltd., 2004, pp. 1-9.

UV-Smart, UVA/B Monitor, Model EC-960-PW, Instruction Manual, Tanita Corporation of America, Inc., downloaded Nov. 16, 2001.

Abrisa Product Information: Cold Mirrors, Abrisa, Jun. 2001, p. 1.

Pärkkä, Juha, et al., "A Wireless Wellness Monitor for Personal Weight Management", VTT Information Technology, Tampere, Finland, Nov. 2000, p. 1.

SafeSun Sensor, User's Manual, Optix Tech Inc., Jun. 1998, 2 pages.

Vitaminder Personal Carb Counter, http://www.auravita.com/products/AURA/ORBU11420.asp. Downloaded Nov. 15, 2005, pp. 1-4.

Dixen, Brian, "ear-catching", Supertesten, Mobil, Apr. 2003, pp. 37-41.

* cited by examiner

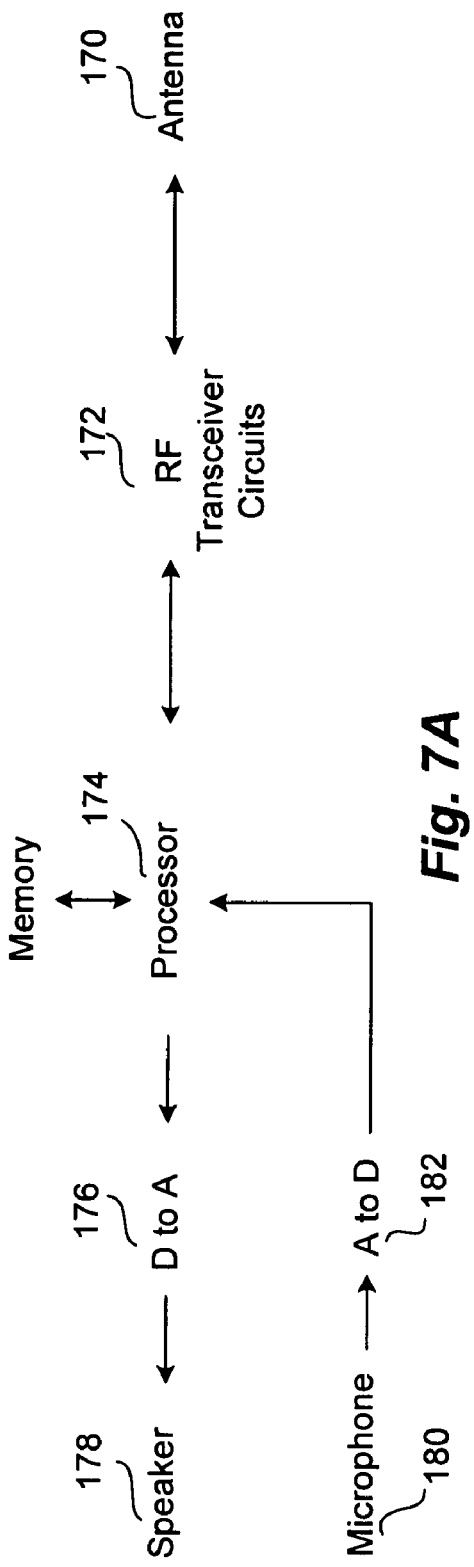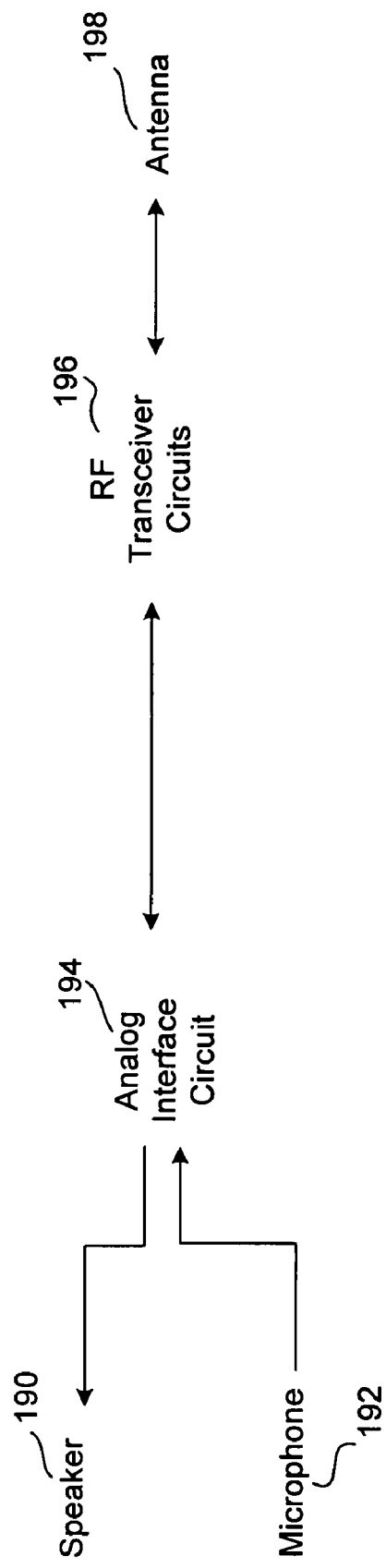

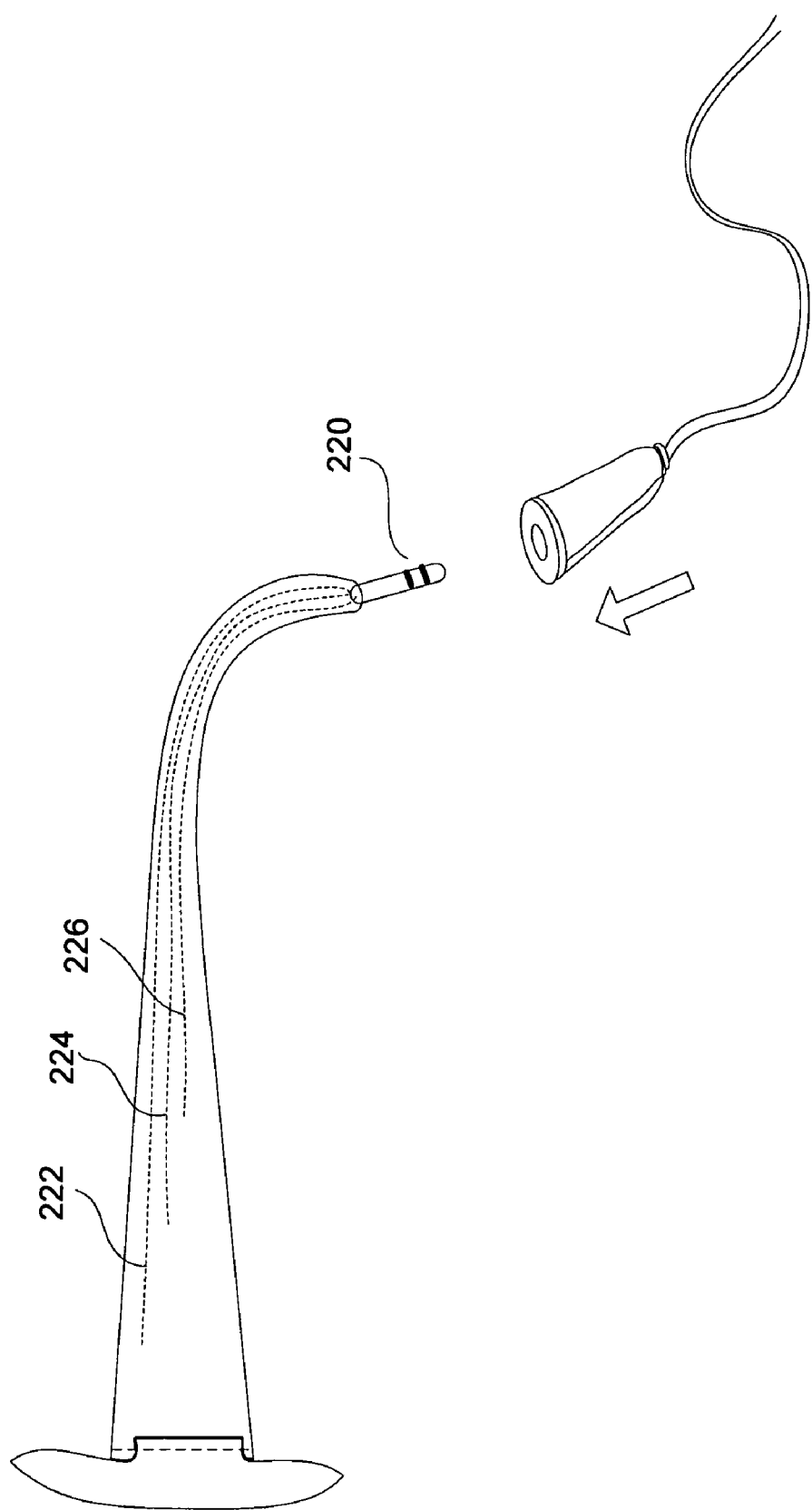

EYEGLASSES WITH HEARING ENHANCED AND OTHER AUDIO SIGNAL-GENERATING CAPABILITIES

CROSS-REFERENCE TO RELATED APPLICATIONS

This application is a continuation-in-part of U.S. patent application No. 10/964,011, filed Oct. 12, 2004, now U.S. Pat. No. 7,192,136 and entitled "TETHERED ELECTRICAL COMPONENTS FOR EYEGLASSES," which is hereby incorporated herein by reference, which in turn claims priority to each of: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference; (v) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (vi) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference.

The application claims priority to each of: (i) U.S. Provisional Patent Application No. 60/592,045, filed Jul. 28, 2004, entitled "EYEGLASSES WITH A CLOCK OR OTHER ELECTRICAL COMPONENT," and which is hereby Incorporated herein by reference; (ii) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference; (iii) U.S. Provisional Patent Application No. 60/618,107, fled Oct. 12, 2004, and entitled "TETHERED ELECTRICAL COMPONENTS FOR EYEGLASSES," which is hereby incorporated herein by reference; (iv) U.S. Provisional Patent Application No. 60/620,238, filed Oct. 18, 2004, entitled "EYEGLASSES WITH HEARING ENHANCED AND OTHER AUDIO SIGNAL-GENERATING CAPABILITIES," and which is hereby incorporated herein by reference; (v) U.S. Provisional Patent Application No. 60/647,836, filed Jan. 31, 2005, and entitled "EYEGLASSES WITH HEART RATE MONITOR," which is hereby incorporated herein by reference; and (vi) U.S. Provisional Patent Application No. 60/647,826, filed Jan. 31, 2005, and entitled "EYEWEAR WITH ELECTRICAL COMPONENTS," which is hereby incorporated herein by reference.

In addition, this application is related to each of: (i) U.S. patent application Ser. No. 10/822,218, filed Apr. 12, 2004, and entitled "EYEGLASSES FOR WIRELESS COMMUNICATIONS," which is hereby incorporated herein by reference; (ii) U.S. patent application Ser. No. 10/964,011, filed Oct. 12, 2004, now U.S. Pat. No. 7,192,136 and entitled "TETHERED ELECTRICAL COMPONENTS FOR EYEGLASSES," which is hereby incorporated herein by reference; (iii) U.S. patent application Ser. No. 11/006,343, filed Dec. 7, 2004, now U.S. Pat. No. 7,116,976 and entitled "ADAPTABLE COMMUNICATION TECHNIQUES FOR ELECTRONIC DEVICES," which is hereby incorporated herein by reference; (iv) U.S. patent application Ser. No. 11/078,855, filed Mar. 11, 2005, now U.S. Pat. No. 7,500,746 and entitled "EYEWEAR WITH RADIATION DETECTION SYSTEM," which is hereby incorporated herein by reference; (v) U.S. patent application Ser. No. 11/078,857, filed Mar. 11, 2005, and entitled "RADIATION MONITORING SYSTEM," which is hereby incorporated herein by reference; (vi) U.S. patent application Ser. No. 11/183,269, filed Jul. 15, 2005, and entitled "EYEWEAR SUPPORTING AFTER-MARKET ELECTRICAL COMPONENTS," which is hereby incorporated herein by reference; (vii) U.S. patent application Ser. No. 11/183,283, filed Jul. 15, 2005, and entitled "EVENT EYEGLASSES," which is hereby incorporated herein by reference; (viii) U.S. patent application Ser. No. 11/183,256, filed Jul. 15, 2005, now U.S. Pat. No. 7,500,747, and entitled "EYEGLASSES WITH HEARING ENHANCED AND OTHER AUDIO SIGNAL-GENERATING CAPABILITIES," which is hereby incorporated herein by reference; (ix) U.S. patent application Ser. No. 11/183,263, filed Jul. 15, 2005, now U.S. Pat. No. 7,380,936, and entitled "EYEGLASSES WITH A CLOCK OR OTHER ELECTRICAL COMPONENT," which is hereby incorporated herein by reference; and (x) U.S. patent application Ser. No. 11/183,276, filed Jul. 15, 2005, now U.S. Pat. No. 7,255,437, and entitled "EYEGLASSES WITH ACTIVITY MONITORING," which is hereby incorporated herein by reference.

FIELD OF THE INVENTION

The present invention relates generally to glasses and more particularly to eyeglasses with hearing-enhanced capabilities.

BACKGROUND OF THE INVENTION

A significant portion of our population has a certain degree of hearing loss. This can be due to, for example, heredity, noise exposure or simply aging. Hearing aids have been the traditional approach for those with hearing difficulties. However, just in the United States, out of the 26 to 28 million people who are hearing impaired, only about 20% of them actually wear any hearing aids. Further, this number of hearing impaired is steadily increasing. Hearing loss typically goes with aging. With the baby boom population rapidly aging, the median age of the entire population is going up. Significantly more people will be in need of hearing aids.

One main reason for the lack of wide adoption of hearing aids could be that there is still a stigma towards wearing them. Wearing hearing aids is typically linked to old age, and people from many cultures value youthfulness. They do not like to be perceived as being old. As a result, many people with mild or moderate hearing loss just ignore it and live with their deficiencies.

Basically, there are three major types of hearing aids—the "behind-the-ear" (BTE) style, the "in-the-ear" (ITE) style, and the completely-in-the-canal (CIC) style. The BTE hearing aids have a number of advantages. They are more applicable for those with severe hearing loss. Through the use of venting, they reduce to a certain degree the effects of occlusion, which is the hollowness, echoic or stuffed sensation of hearing one's own voice as one talks with a hearing aid inside one's ear. The ITE (or CIC) designs are more inconspicuous. They are located inside the ear. Just like the BTE, individual ear molds are typically made for such hearing aids based on an impression of the user's ear canal. Such custom-made hearing aids can be expensive. But, in certain countries, even with the government paying for such hearing aids, most people still do not like to wear them.

Hearing ability tends to decrease gradually, particularly as we age. A person with mildly-impaired hearing normally does not need the same degree of hearing assistance as one with severely-impaired hearing. Nevertheless, though their hearing loss is not severe, they still could benefit from mild or moderate enhancement to their hearing.

One approach to make the hearing aids not as conspicuous is to add them to eyeglasses, either by affixing them to, or built them into, glasses. However, it may still be obvious to a third party that the person is wearing a hearing aid. Also, it is not easy to have hearing aids attached to or built-into glasses. Eyeglasses frames tend to be very compact and lightweight and thus have little space for electrical components. Moreover, since eyeglass frames are often fashionable items whose designs are important, there are substantial design tradeoffs involved with hearing aids built in or attached to the eyeglass frames.

It should be clear from the foregoing that there is still a need for improved techniques to assist those who are hearing impaired, and there is still a need to improve techniques to bring electrical signals to us through glasses.

SUMMARY OF THE INVENTION

The present invention provides different embodiments of glasses that can be applied to multiple functions. With a user wearing such a pair of glasses, it would be more difficult for a third party to know the specific function or reason the user is wearing the glasses for. Regarding the locations of the electrical components for the multiple functions, different embodiments range from all of the components in the glasses to the glasses primarily functioning as a headset.

In one embodiment, the present invention pertains to a pair of glasses with hearing enhancement and other signal generating capabilities. Most people today do not desire to wear hearing aids or hearing enhancement devices. One major reason could be that they do not want to be perceived as being old. In this embodiment, a pair of glasses, with speakers, has hearing enhancement capabilities. With the speakers in the glasses, the speakers can be positioned in close proximity to the ears of the users. In addition to having hearing enhancement capabilities, the glasses also include at least one electrical component to generate other audio signals. For example, the glasses can play music. Such a hearing-enhanced device can remove the associated stigma of conventional hearing aids. A third party may not be able to tell whether the user is wearing the glasses to hear music or whether the user is wearing the glasses to have his hearing enhanced.

In one embodiment, the glasses include at least one speaker and typically two. Each speaker is in one of the temples of the glasses, closer to the corresponding hinge of that temple than the other end (the free end) of the temple. There is also a tube extending from the speaker to guide sound generated by the speaker to the corresponding ear of the user. The tube can be rotated, such as from behind the temple to being downward at an angle towards the ear of the user. The two speakers can also be electrically connected by a conductor, with the conductor linking the speakers through the lens holders of the glasses.

The glasses include a microphone, which can be located close to one of the hinges of the glasses. In another embodiment, there can be two microphones. The one or more microphones can be directional for receiving signals in specific directions.

In another embodiment, to reduce the weight of the glasses and to enhance the ease of aesthetic design of the glasses, some of the hearing enhanced electronics are not in the glasses. Instead they are in a portable device carried by the user. The portable device is electronically coupled to the glasses wirelessly or through a wired connection.

In the wireless embodiment, the glasses also include a wireless transceiver. In this embodiment, the microphone does not have to be at the glasses. The microphone can also be wirelessly coupled to the glasses and/or the portable device.

In the wired embodiment, the glasses also include a connector for at least one wire to be connected to the glasses. The connector can be at the free end of one of the temples of the glasses, or the connector can be at another location at the glasses. Different types of standard or non-standard connectors can be used.

In the wired embodiment, the microphone also does not have to be at the glasses. The microphone can be mounted on the wire that connects the glasses to the portable device.

The glasses can have a number of hearing enhancing capabilities. In one embodiment, the hearing enhancement is for those with mild or medium hearing loss. In another embodiment, the hearing enhancement is for those with severe hearing loss.

One hearing enhancement functionality is frequency-dependent amplification. For example, higher frequencies are amplified more than lower frequencies; certain frequency bands are not amplified; or the frequencies to be amplified are tailored to the user.

To tailor the amplification to a user, hearing enhancement capabilities can be calibrated against the user. The calibration can be done by the user or by a third party. The calibration can be performed through a website, which guides the user through the process. The calibrated frequency hearing profile of the user can be stored. Such calibration can be performed periodically, such as once a year.

The glasses may also include at least one electrical component for power management. Hearing enhancement does not have to be fully functional at all times. In one embodiment, the hearing enhancement function is on demand. The enhancement can go into a sleep mode when there is no audio fluctuation beyond a certain threshold in the ambient environment. The amplification can also depend on the ambient noise level.

In other embodiments, the glasses can also have at least one electrical component to generate other audio signals. These other audio signals do not originate from signals captured by the microphone(s) in the glasses. These signals can originate from relatively private sources or public sources.

In one example of signals originating from private sources, the glasses include the electrical components to operate as a phone. The glasses can pick up signals from a caller, and the speaker(s) in the glasses re-generate the audio signals of the caller. Again some of the electrical components of the phone can be in a portable device wired or wirelessly coupled to the glasses. There can be an indicator indicating an incoming call. The indicator could be a signal light.

Regarding processing an incoming call, in one embodiment, if the user wants to pick up the incoming call, the hearing enhancement mode is deactivated. In another embodiment, one or more functionalities of the hearing enhancement mode operate on the incoming call. There can also be noise cancellation functionalities, such as through two directional microphones, one pointing at the user's mouth, and the other pointing away.

In another example of signals originating from private sources, the glasses include the electrical components to operate as a player. Again some of the electrical components of the player can be in a portable device wired or wirelessly coupled to the glasses. The player can be a MP3 or other multimedia asset player. The player can be a radio. The radio can be personalized to the user, for example, by being aware of the songs the user prefers. In one embodiment, when the user starts the player, the hearing enhancement mode is deactivated. In another embodiment, different capabilities of the hearing enhancement mode operate on the signals from the player.

In yet another embodiment, the other audio signals are from public sources. For example, the glasses can be coupled to a conference microphone or a theater speaker wirelessly, and thus be capable of capturing and enhancing the signals from those sources. Again, the coupling can be through a portable device wired or wirelessly coupled to the glasses.

There can be one or more control knobs or switches at the glasses or at a portable device coupled to the glasses. Different types of switches are applicable for different applications.

Regarding power sources for the electrical components in the glasses, in one embodiment, the power sources, such as batteries, are in the glasses. In another embodiment, the power sources are located outside the glasses, but connected to the glasses through an adapter. In yet another embodiment, the power sources are in a portable device electrically connected to the glasses, and the power sources can be rechargeable.

A number of embodiments have been described with glasses having hearing enhanced and/or other audio signal generation capabilities. In one embodiment, the glasses function as a headset and are adaptable for different applications, such as hearing enhancement, communication (e.g. phone operation) and listening to audio signals (e.g. MP3 operation). When a person is using the headset, a third party again may not be able to tell whether the person is having his hearing enhanced, or listening to other audio signals generated.

Additional benefits of having glasses as headsets are that eyeglasses frames tend to be very compact and lightweight and thus have little space for electrical components. With at least a portion of the electrical components for a system, such as a hearing enhancement system, outside the glasses, additional weights required for the system on the glasses are reduced. Further, eyeglass frames are often fashionable items whose designs are important. By reducing the amount of electrical components, and in turn, space required in the glasses, design tradeoffs required due to having electrical components in the eyeglass frames are reduced.

In a first example of glasses functioning as a headset, the glasses can include a connector and two speakers, one at each temple, both speakers electrically connected through the glasses. The connector can be located at the free end of one of the temples. The connector can be used to receive stereo signals, such as from an MP3 player. Based on a headset-to-phone cord, the speakers in the headset can also be used to receive a phone call.

In a second example of the glasses functioning as a headset, the glasses can include two connectors. Each connector can be at one of the temple tips of the glasses, and each connector can be connected to the speaker at that temple. To send audio signals to the speakers, the two connectors can be tethered and connected together through a connector external to the glasses. The external connector can then operate as the connector in the first example. Regarding other embodiments, the speakers can be in the temples, such as closer to their corresponding lens holders than the free end of the temples. In another example, the speakers can be in the region of the temple tips. The speakers can be embedded in the glasses or can be external to the glasses on stubs or extensions. For speakers that are embedded in the glasses, each speaker can have a tube extending towards an ear to guide audio signals. At the end of each tube, there can be an ear bud for inserting into the ear. The tubes can be permanently attached to the glasses, or each can be attachable to the glasses. The tubes or the stubs can also be retractable and extendable, and the position of the tubes or the stubs can be adjustable.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIGS. 7A-7B show different embodiments of the present invention illustrating some of the electrical components for wireless connections to a pair of glasses.

FIG. 8 shows a male stereo connector at the end of a temple according to one embodiment of the invention.

Same numerals in FIGS. 1-26 are assigned to similar elements in all the figures. Embodiments of the invention are discussed below with reference to FIGS. 1-26. However, those skilled in the art will readily appreciate that the detailed description given herein with respect to these figures is for explanatory purposes as the invention extends beyond these limited embodiments.

DETAILED DESCRIPTION OF THE INVENTION

The present invention provides different embodiments of glasses that can be applied to multiple functions. With a user wearing such a pair of glasses, it would be more difficult for a third party to know the specific function or reason the user is wearing the glasses for. Regarding the locations of the electrical components for the multiple functions, different embodiments range from all of the components in the glasses to the glasses primarily functioning as a headset.

Figure 1:
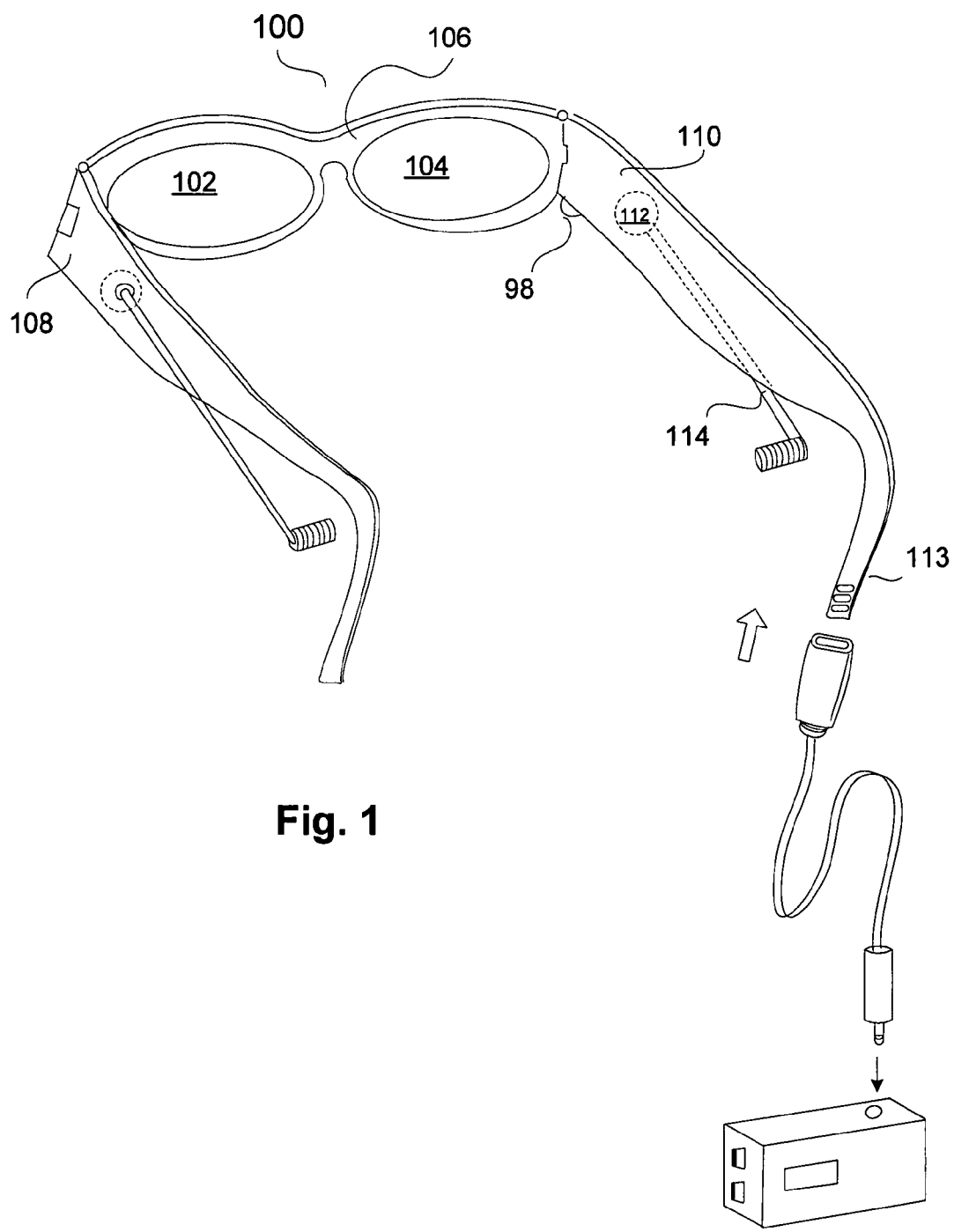
FIG. 1 shows one embodiment of the invention with a pair of glasses having speakers.

FIG. 1 shows one embodiment of the invention with a pair of glasses 100 having speakers. The glasses 100 include a first lens holder 102 and a second lens holder 104. Both lens holders are for receiving lenses. The first lens holder 102 has a first side and a second side. The second lens holder 104 also has a first side and a second side. The pair of glasses has a bridge element 106. The bridge element 106 is coupled to the first side of the first lens holder 102 and the second side of the second lens holder 104. In one embodiment, the lens holders and the bridge element are not separate pieces, but are an integral piece.

The pair of glasses 100 also includes a first temple 108 and a second temple 110. The first temple 108 is pivotally secured to the second side of the first lens holder 102 through a joint. And, the second temple 110 is pivotally secured to the first side of the second lens holder 104 through another joint.

In a number of embodiments, the glasses include one or more electrical components partially or fully embedded in the glasses. An electrical component can be a resistor, capacitor, inductor, transistor or other electrical part, other than just a conductor or a wire allowing current to flow between or among electrical components. An electrical component can also be more complicated such as an electrical circuit or an integrated circuit.

FIG. 1 shows one embodiment of the glasses 100 with electrical components that include two speakers, each at least partially embedded in the glasses. The speakers can be used to enhance the hearing of the user wearing the glasses. In one example, each speaker, such as speaker 112, is in one of the temples, such as temple 110, of the glasses 100. Each speaker is closer to one end of the temple than the other end. In the embodiment shown in FIG. 1, each speaker is closer to the end of the temple that is in the vicinity of the lens holder or the hinge or the joint of the glasses, instead of the end that is typically not attached to a hinge. The end of a temple that is typically not attached to a hinge can be known as the free end of that temple. The speakers can be partially embedded in the glasses. For example, the mouth of each speaker, where audio signals propagate from and where sometimes there are small holes on a sheet of material, can be exposed and not totally covered up by the temple.

In the embodiment shown in FIG. 1, both speakers are embedded in the glasses, and the speakers output audio signals in the outward direction. In another embodiment, the speakers output audio signals in the inward direction. For example, the output of the speakers can be facing inwards, towards the user.

The speakers can be embedded in the glasses in a number of ways. For example, each speaker can be first assembled onto or electrically coupled to a circuit board, which includes additional electrical components for the glasses. The glasses can be made of plastic (e.g., plastic frames). With the corresponding speaker, each circuit board can be shaped to fit, for example, into a temple of the glasses. Each circuit board with a speaker is placed into a mold. Then, hot, molten plastic is injection molded around each circuit board with the speaker to form the two temple pieces of the glasses. To reduce weight, the wall of the glasses can be made relatively thin through injection molding techniques.

In another embodiment, the glasses have metallic frames. For example, the frames can be made of Titanium, which is a relatively light metal. Also, Titanium is relatively non-conductive and strong, and is quite immune to corrosion. Further, Titanium can be anodized or heat colored.

For glasses with metallic frames, to prevent circuits from being shorted or to reduce leakage current, one embodiment provides an insulating layer between a circuit board in the glasses and the corresponding metallic frame. One example of an insulting layer is a tape to encapsulate the electrical components. The tape is non-conducting so as to provide insulation and, to a certain degree, can also provide mechanical stiffness. One way to make such a temple is to have two sheets of the metal die-stamped to form the two halves, or the two faces of a temple piece. A circuit board with a speaker is made to fit into the space between the faces. Then, two die-cut pieces of tape can cover the top and the bottom surfaces of the circuit board. The board and the speaker with the tape are sandwiched between the faces to form the temple. The tape can be double-sided sticky tapes, with one side sticking to the circuit board, and the other side sticking to the temple. An adhesive can be used to glue the two faces of the temple piece together.

In yet another embodiment, the frames are made of hard rubber. The frames can be manufactured in an approach similar to injection molding techniques, with circuit boards and/or speakers inserted into the mold along with the rubber at the time of molding.

Different types of speakers can be used, such as, standard, fixed-magnet/moving coil speakers; speakers with fixed-coil and a steel diaphragm; piezo-electric speakers; and electrostatic speakers.

In one embodiment, the glasses further include a tube, such as a plastic tube, extending from each speaker, such as tube 114 from speaker 112. Each tube serves to guide sound generated by its corresponding speaker to one of the ears of the user. In one embodiment, each tube extends from its speaker to the opening of an ear canal of the user.

Figure 2:
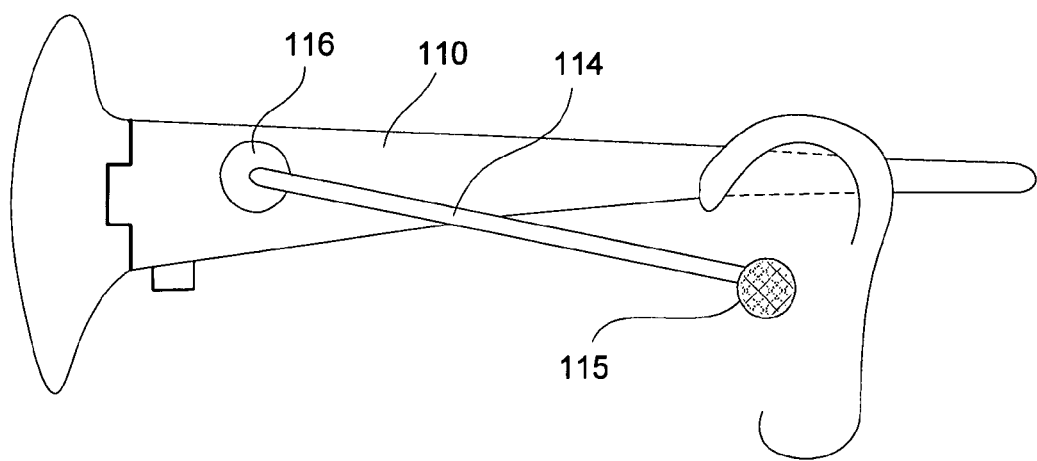
FIG. 2 shows a tube extending from a speaker at a temple of the glasses to guide sound to one of the ears of the user according to one embodiment of the invention.

FIG. 2 shows an embodiment where a tube 114 is located on the outside of a temple 110. In another embodiment, the tube can be on the inside of a temple.

In one embodiment, a tube can be rotated, such as from along the temple (behind a temple if the tube is on the inside of the temple) to being downward at an angle towards one of the ears of the user, such as the position shown in FIG. 2. To increase flexibility, the tube can be attached to a rotating disk 116, which allows rotation about the corresponding speaker.

In another embodiment, the tube is malleable. This allows the tube to be placed in different positions.

Figure 3:
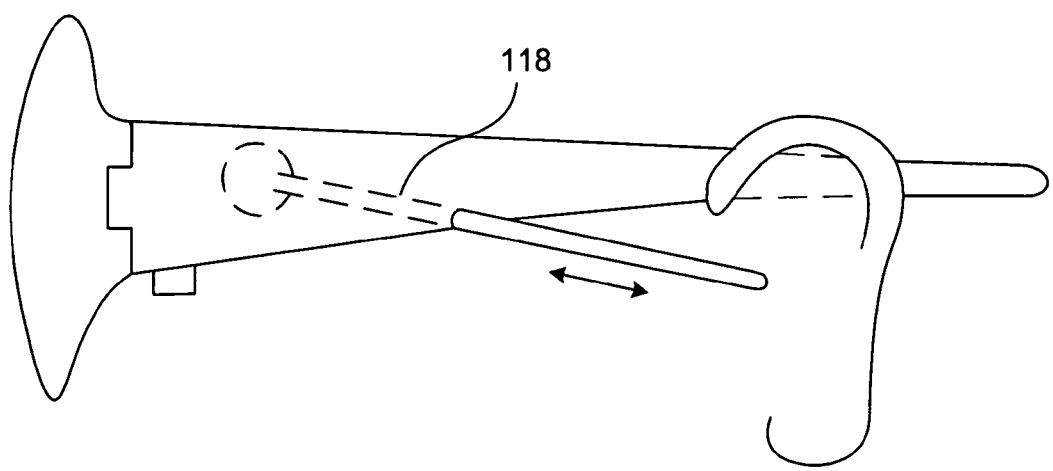
FIG. 3 shows a retractable tube extending from a speaker at one of the temples of the glasses according to one embodiment of the invention.

In one embodiment, the length of the tube is adjustable. FIG. 3 shows such an embodiment of a pair of glasses with a retractable tube 118. In the figure, the tube is shown to be in its extended position. As an example, the retractable tube 118 can be retracted into the corresponding temple. As another example, the retractable tube 118 can retract on itself (e.g., telescoping).

In one approach, there also is a plug 115 at the end of the tube 114 for inserting into an ear of the user, as shown in FIG. 2. The plug 115 can be an ear bud. The plug 115 can provide a cushion of foam rubber or other materials. Such materials give comfort and/or enhance sound coupling to the ear canal.

In one embodiment, each ear bud is individually made based on an impression of the user's corresponding ear canal. In another embodiment, each ear bud is custom fitted into the corresponding ear of the user.

Figure 4:
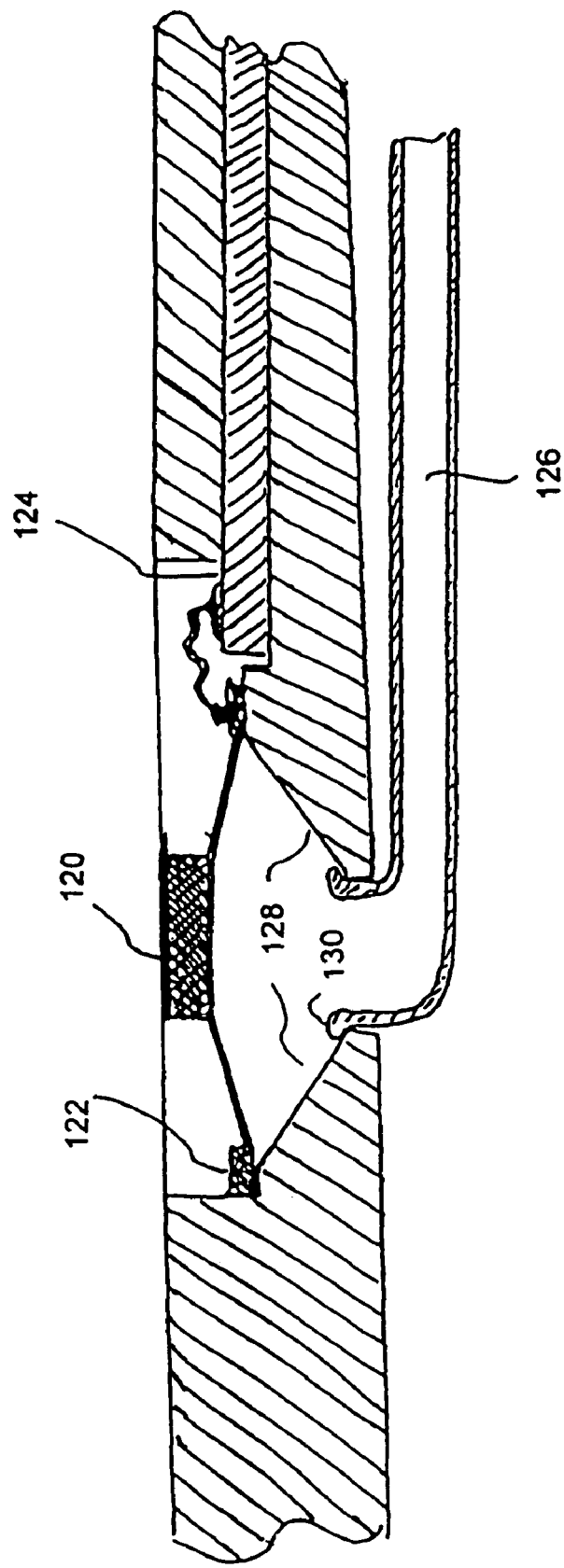
FIG. 4 shows a funnel at the output of a speaker in the glasses according to one embodiment of the invention.

In another approach, there is a funnel at the output of a speaker. FIG. 4 shows the cross section of such a funnel from a speaker 120 at a temple region of the glasses. As shown in FIG. 4, the speaker 120 sits on a speaker frame 122, and the speaker 120 is electrically connected to a circuit board 124. As sound is generated from the speaker 120, the sound propagates to a tube 126 through a structure in the shape of a funnel 128. Such a structure can help guide the sound to the tube 126 (i.e., improved sound coupling). Also, FIG. 4 shows the tube 126, which can be the tube 114 shown in FIG. 2, mounted onto the temple region of the glasses with a circular lip 130. Such a lip 130 allows the tube 126 to rotate relative to the glasses. In the embodiment shown in FIG. 4, the speaker 120 is embedded in the glasses. Also, in FIG. 4, the tube 126 is at the front side of the speaker 120. In another embodiment, a tube can extend from the back side of the speaker to couple the sound from the speaker to an ear.

Figure 5A:
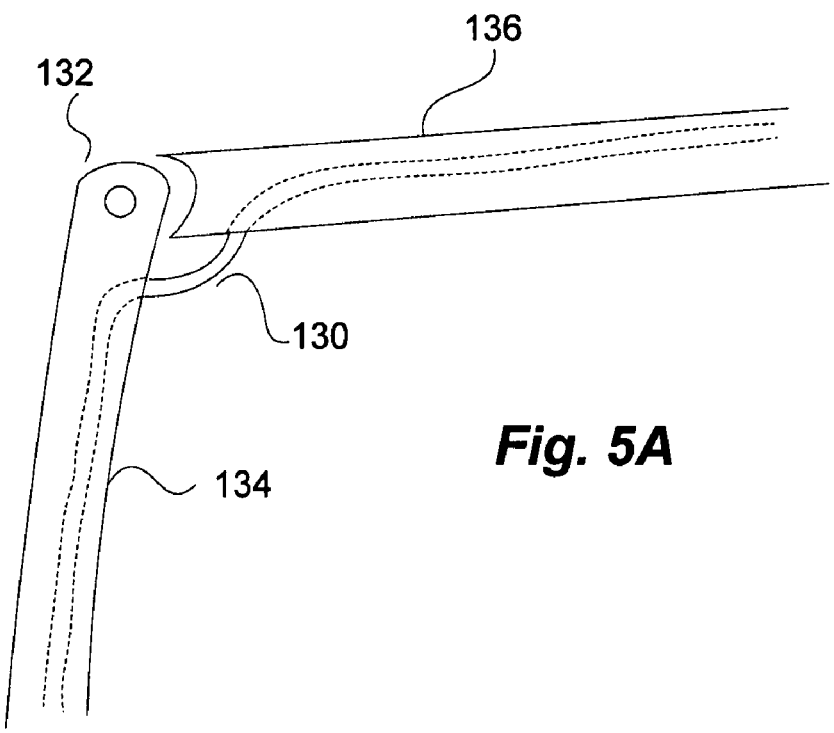
FIGS. 5A-5B show an embodiment of the invention with a wire connecting speakers in the glasses.
Figure 5B:
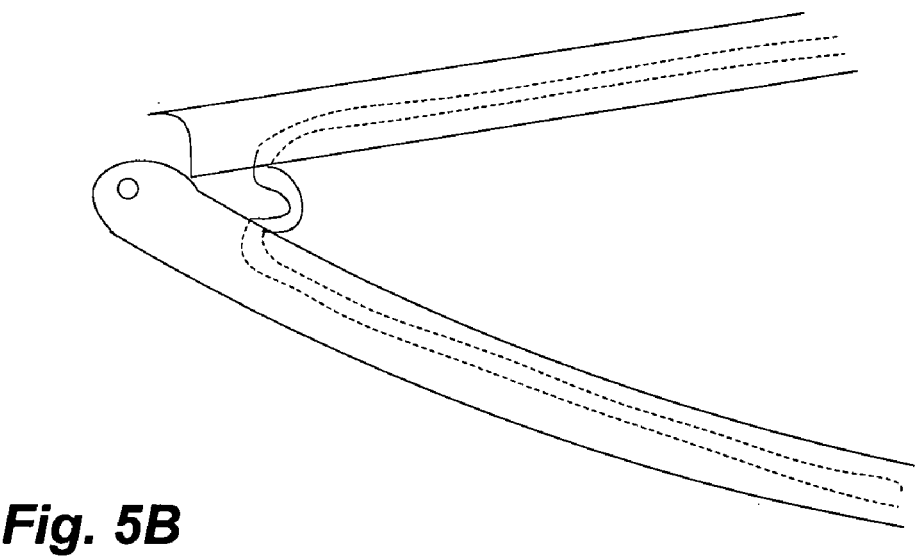

In the embodiment of the glasses with two speakers, the two speakers can also be electrically connected by a conductor or an electrical wire, with the conductor linking the speakers through the glasses, such as through the lens holders of the glasses. FIGS. 5A-5B show an embodiment of the wire 130, with FIG. 5A illustrating a hinge 132 of the glasses in the extended position, and FIG. 5B illustrating the hinge 132 partially closed. As shown in the two figures, the wire 130 is embedded in a temple 134 to connect to the speaker in that temple. The wire 130 extends from the temple 134 to a lens holder 136, and then to the other temple of the glasses to connect to the speaker in the other temple.

Referring back to FIG. 1, electrical components in the glasses can also include at least one microphone 98, which can be located at a temple 110, closer to the hinge than the free end of that temple 110. The microphone 98 receives audio signals. For glasses with hearing enhancement capabilities, the audio signals are modified or enhanced (to be further described below), and then sent to the speaker(s) in the glasses for the user to hear. In the embodiments that do not include plugs or ear buds that plug the ear canals of the user, but may still include tubes guiding sound from speakers to each ear, the user can hear both the enhanced sound based on hearing enhanced electrical components and sound directly from the ambient environment.

In another embodiment, there can be two microphones. Each microphone can, for example, be located close to one hinge of the glasses. The microphone close to the left hinge can be electrically connected to the speaker at the left temple, and the microphone close to the right hinge can be electrically connected to the speaker at the right temple. The one or more microphones can be directional, more preferential towards signals in specific directions. For example, the microphone close to the left hinge can be more preferential towards signals coming from the left, and the microphone close to the right hinge more preferential towards signals from the right.

In one embodiment, to reduce the weight of the glasses and/or to enhance the ease of aesthetic design of the glasses, some of the electrical components are not in the glasses. Instead, they are in a base or a portable device carried or worn by the user. A number of embodiments regarding a base have previously been described in U.S. patent application Ser. No. 10/964,011, entitled "TETHERED ELECTRONIC COMPONENTS FOR EYEGLASSES," and filed Oct. 12, 2004, which is hereby incorporated by reference. In embodiments with the base, the base is tethered, or connected with a wire, to the glasses. In embodiments with the portable device, the portable device is electronically coupled to the glasses or to the base (if there is a base) wirelessly or through a wired connection.

Figure 6:
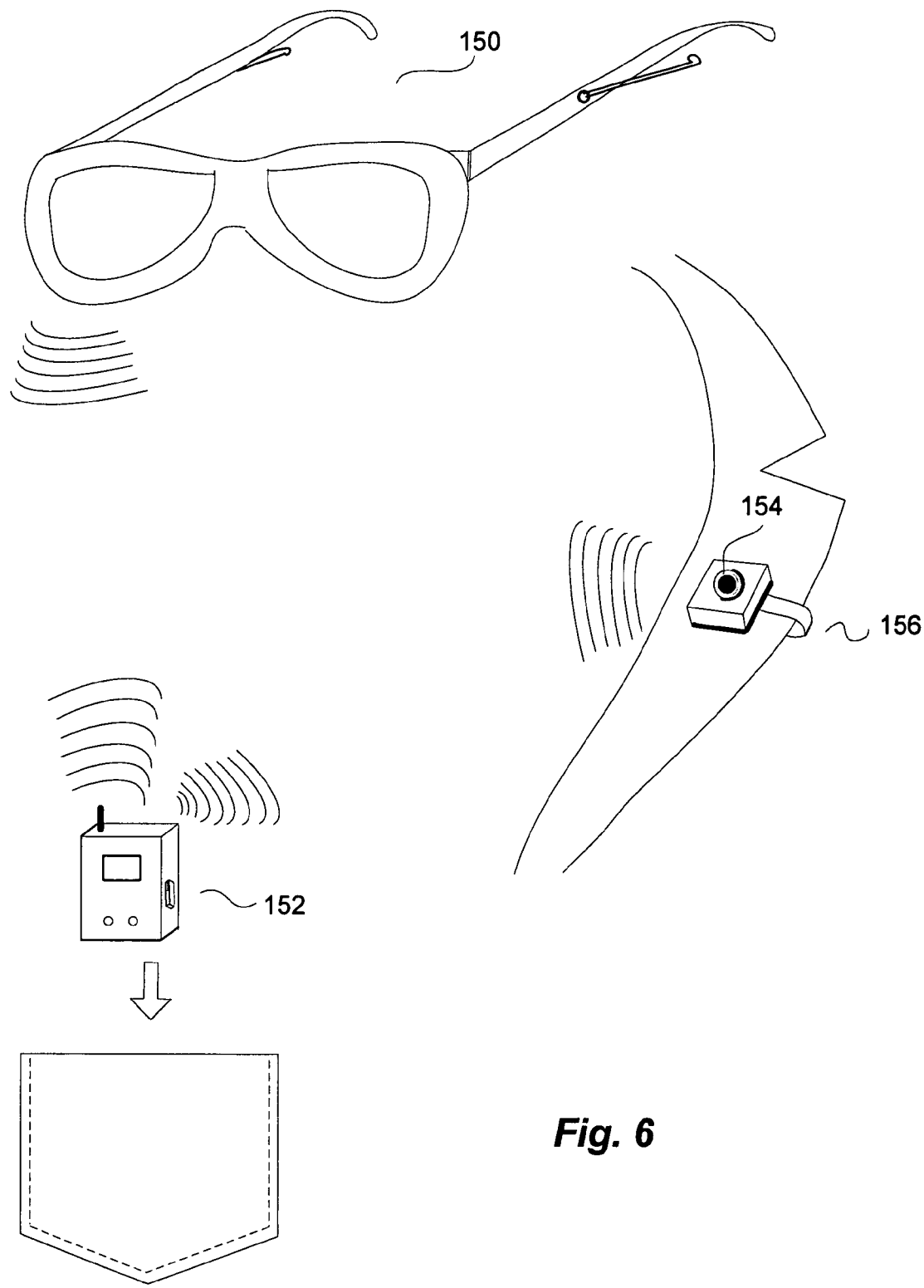
FIG. 6 shows one embodiment of the invention with a pair of glasses having speakers that are wirelessly coupled to a portable device.

FIG. 6 shows one embodiment of the invention with a pair of glasses 150 having speakers. The glasses 150 can be wirelessly coupled to a portable device 152. In this embodiment, there can also be one or more microphones 154 wirelessly coupled to the glasses. As an example, FIG. 6 shows the microphone 154 in a package that can include a clip 156 to attach the microphone 154 to a piece of clothing of the user, such as to one of the lapels on a jacket of the user. In such a wireless embodiment, the glasses 150 also include a wireless transceiver for connection to the portable device 152 and/or the microphone 156.

FIGS. 7A-7B show examples of different embodiments illustrating some of the electrical components for wireless connections to, or for a wireless transceiver in, a pair of glasses. In FIG. 7A, a high frequency or RF antenna 170 wirelessly captures high frequency or RF signals for RF transceiver circuits 172. If the transceiver circuits are for a conventional superheterodyne system, the transceiver circuits 172 mix the RF signals down to IF signals. Then the IF signals are processed by baseband circuits to form digital outputs. Digital outputs from the baseband circuits are coupled to a processor 174 for further processing. The baseband circuits can be incorporated in the processor, or can be separate from and coupled to the processor. Outputs from the processor 174 are fed to a D-to-A converter 176 to generate audio signals for a speaker 178.

Similarly, audio analog signals from a microphone 180 can be fed to an A-to-D converter 182 to generate digital signals for the processor 174 and then to the baseband circuits and the RF transceiver circuits 172. The digital signals are then up-converted by the RF transceiver circuits 172 and wirelessly transmitted by the antenna 170.

In another embodiment, digital conversion is moved closer to the antenna. For example, instead of mixing RF into IF signals, the RF transceiver circuits directly perform digital conversion from the RF signals.

High frequency filters can be used at the front end of the RF transceiver circuits for the RF signals. In one embodiment, to save space, FBAR (film bulk acoustic resonator) duplexer is employed. A set of piezoelectric filters can be used to separate incoming and outgoing signals. For cell phone operation (which will be further described below), such filters can enable a user to hear and speak simultaneously.

FIG. 7B shows another example of some of the electrical components in or tethered to a pair of glasses for wireless connections. This embodiment does not depend on digitizing signals. A speaker 190 and a microphone 192 are connected to an analog interface circuit 194, which is coupled to a RF transceiver circuit 196 and an antenna 198. For the speaker application, the transceiver circuit 196 converts the RF signals down into IF signals, which are converted by the analog interface circuit 194 into analog signals for the speaker 190. Similarly, for the microphone application, its analog signals are converted into the IF signals by the analog interface circuit 194 to be up converted by the RF transceiver circuits 196 into RF signals for the antenna 198. These types of wireless connection circuitry are suitable, such as, for simple radios, analog cell phones, CB radios, walkee-talkees, police radios, intercom systems, or hearing enhancement applications.

Note that in the above examples shown in FIGS. 7A-7B, signals from the microphones are transmitted by a wired connection, instead of a wireless connection.

As described above, in different embodiments, some of the electrical components are not in the glasses. Instead they are in a base or a portable device, which can be carried by the user. The portable device can be electrically coupled to the glasses through a wired connection. In such approaches, the glasses also include at least one connector to receive an electrical wire from the base or the portable device. The connector can be at the free end of one of the temples of the glasses, or the connector can be at another location of the glasses. Different types of standard or non-standard connectors can be used and have previously been described in U.S. Provisional Application No. 60/583,169, filed on Jun. 26, 2004, which is hereby incorporated by reference.

In one embodiment, a standard cylindrical plug connector is located at one end of a temple. From a different perspective, the temple molds around the end of the plug. FIG. 8 shows one such embodiment. The plug 220 can be a standard audio connector or a 3-wire or three terminal plug, such as a 3.5 mm male stereo mini-phone plug. The 3 wires for such a plug are typically one for ground, the other two applicable for two signals, such as signals for two speakers to create stereo effects. FIG. 8 also shows the three wires 222, 224 and 226, inside the temple, extended from the plug 220. These wires are for connection to electrical components in the glasses.

In one embodiment, the cylindrical plug 220 shown in FIG. 8 can be covered, such as with a cap or a cover, to protect, encapsulate or shroud the plug 220. Or, at least a portion of the plug is covered. Such covering can be for esthetic reasons, or can be to prevent the plug 220 from scratching the face of the user (if the plug has relatively sharp edges) when the user is putting on the pair of glasses.

Instead of a three terminal plug, other types of standard cylindrical plugs applicable to different embodiments of the present invention include, for example, a serial connector with 3 pins, typically one for ground, one for transmitting data (Tx) and the third for receiving data (Rx); or a 2-wire connector, one served as ground, the other for carrying signals, such as power and modulated signals.

Figure 9:
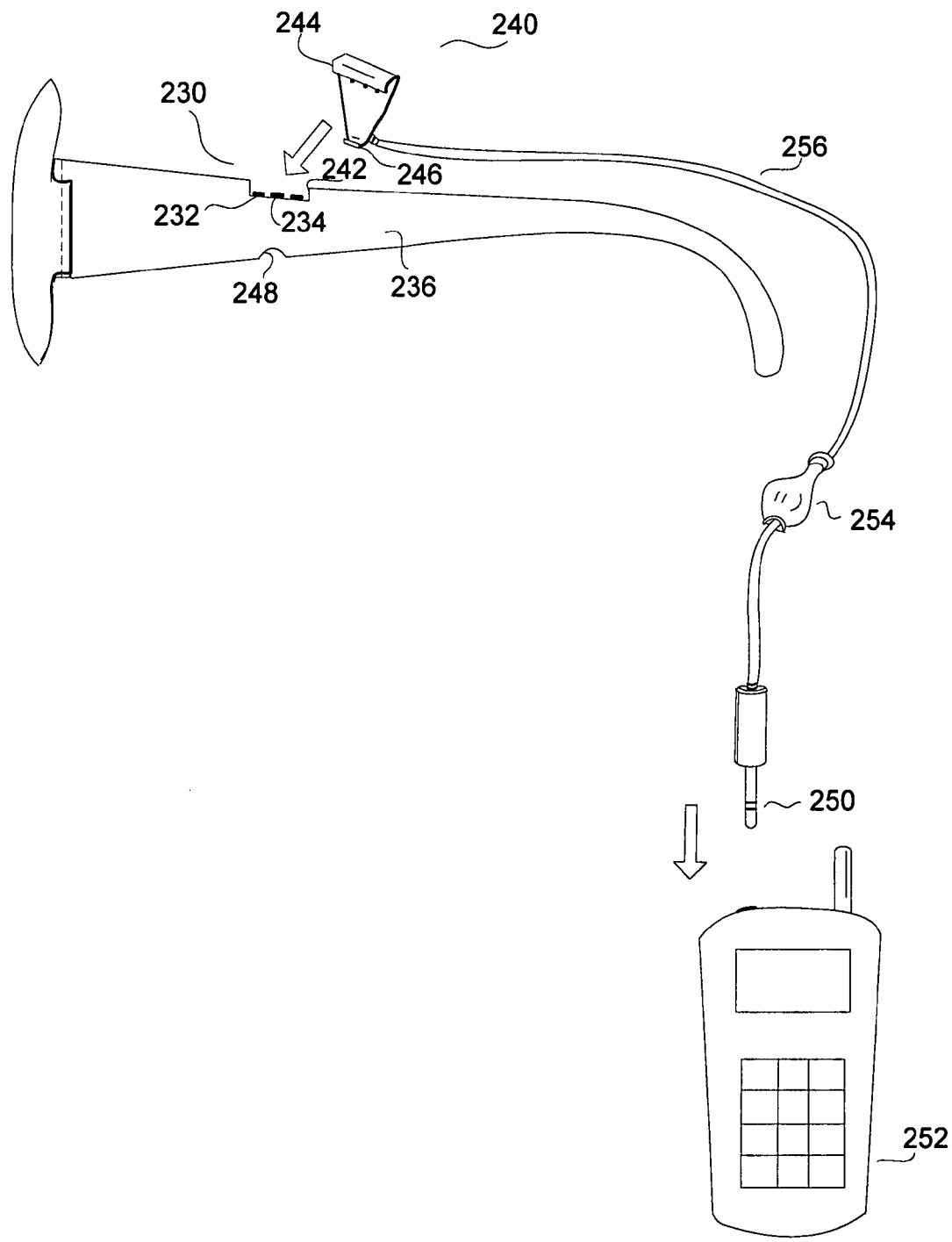
FIG. 9 illustrates a connector applicable to clamp onto a temple of a pair of glasses according to an embodiment of the invention.

Instead of a standard connector, a connector can be a nonstandard connector. FIG. 1 shows a non-standard connector 113 at the free end of one of the temples 110. Instead of having a connector at the free end of a temple, a connector can be at another location of the glasses. FIG. 9 shows an example of a non-standard connector 230. The connector 230 includes one or more conductive pads, 232 and 234, on the top side of a temple 236. The connector 230 is designed to receive another connector 240 that grabs onto or attaches around the side of the temple. There can be an indentation 242 on the temple 236 to receive the other connector 240. The other connector 240 can include a top 244 and a bottom 246 clip. There are a number of conductive pads or sheets inside the other connector 240. The indentation 242 provides alignment for connection. When attachment is at the indentation 242, the conductive pads, 232 and 234, at the temple 236 will be in contact with the conductive pads or sheets in the other connector 240. There can also be another indentation 248 at the temple 236 to receive the bottom clip 246. This can further enhance the alignment process and assist with securing the connection.

In FIG. 9, the other connector 240 is tethered to a plug 250, which can be inserted into a portable device 252. The portable device 252, for example, can be a cell phone. The portable device can include personal digital assistant (PDA) functionalities. This type of non-standard clip-type connector could be relatively easily applied to the temple with one hand, for example, while the user is driving a car.

In the wired embodiment shown in FIG. 9, a microphone does not have to be in the glasses. As shown in FIG. 9, a microphone 254 can be attached to the wire 256 that connects the glasses to the portable device 252.

Figure 10:
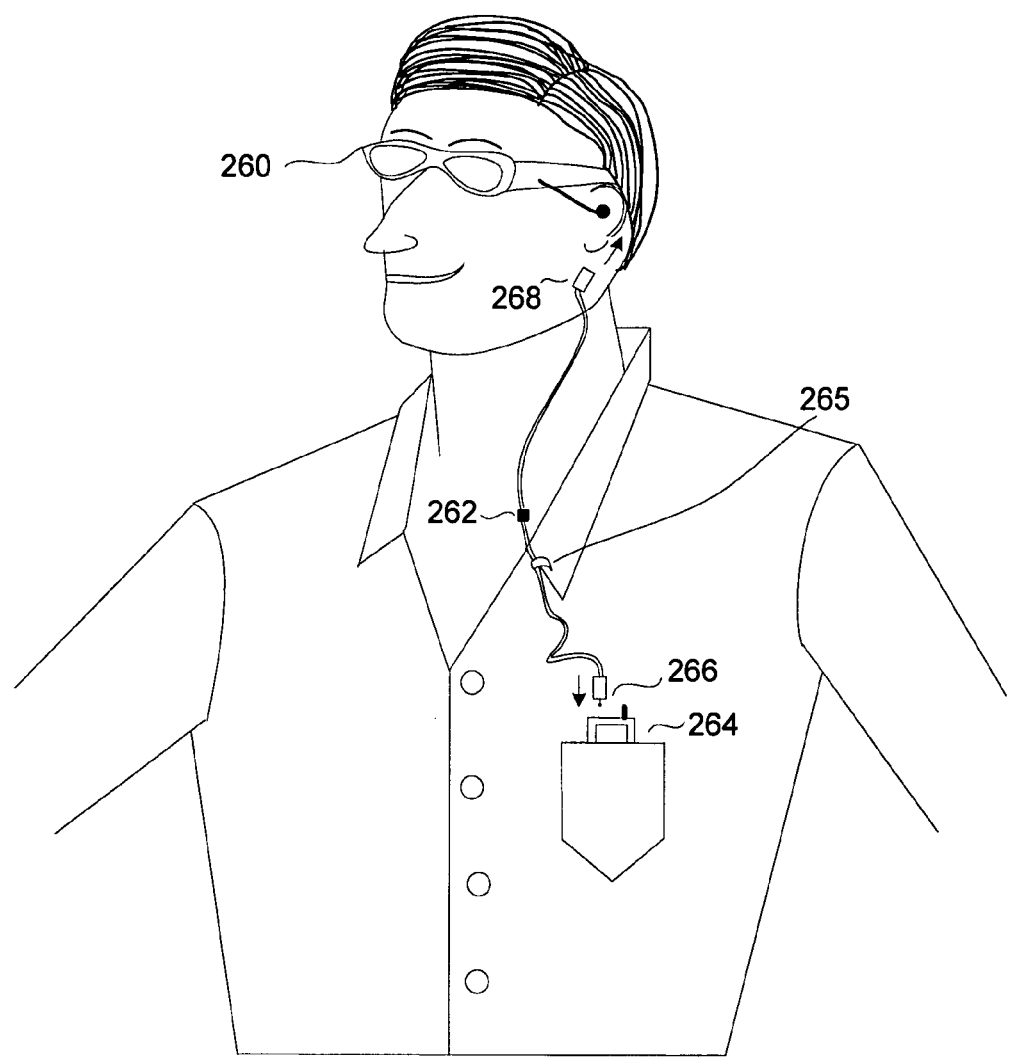
FIG. 10 shows one embodiment of the invention with a pair of glasses having a microphone coupled to the wire connected to a portable device.

FIG. 10 shows one embodiment of the invention with a pair of glasses 260 having a microphone 262 coupled to a wire. The wire is connected to a portable device 264 through a plug 266, and to the glasses 260 through a jack 268. The portable device 264 can be in a shirt pocket as shown. There can also be a clip 265 to attach the wire to an article of clothing worn by the user.

In one embodiment, the glasses include electrical components for hearing enhancement functionalities. The electrical components enhance audio signals, such as audio signals received by a microphone at the glasses. Then the enhanced signals are sent to the speakers for the user to hear. In one embodiment, the hearing-enhancing electrical components include a processor. The processor can be the processor 174 shown in FIG. 7A. In this embodiment, the hearing-enhancing functionalities are performed through digitizing the corresponding audio signals. Then the processor, using digital signal processing techniques, operates on the digitized signals, such as boosting specific frequency bands.

In another embodiment, the hearing enhancing functionalities are provided by analog filter circuits. For example, analog filter circuits, using analog processing techniques, operate on the audio signals, such as boosting specific frequency bands.

Figure 11:
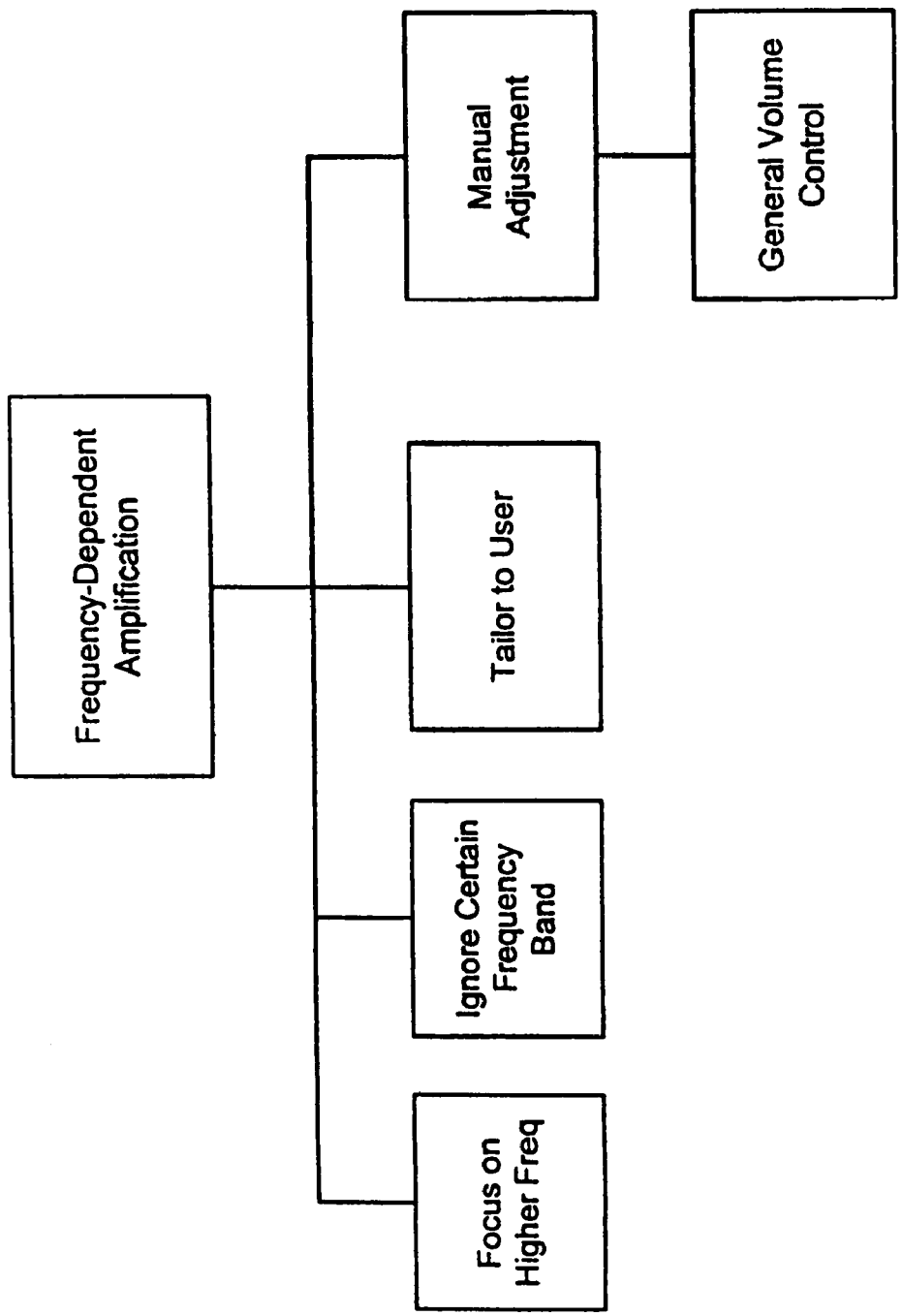
FIG. 11 shows different embodiments regarding frequency-dependent amplification of the present invention.

In one embodiment, one hearing enhancement function includes amplifying the audio signals received in a frequency range between 500 Hz to 8 kHz. Typically, a user's hearing impairment is not the same across all audio frequencies. For example, in English, the user might be able to easily pick up the sound of vowels, but not the sound of consonants, such as "S" and "P". FIG. 11 shows a number of embodiments regarding frequency-dependent amplification of the received audio signals.

One approach for frequency-dependent amplification focuses on amplifying the higher audio frequency ranges. This approach assumes that hearing degradation typically starts at the higher audio frequencies, such as above 2 to 3 kHz. Hearing may need more assistance at the higher audio frequency range. For example, the audio signals received by a microphone can be amplified by 30 dB in the frequency range from 2 kHz to 4 kHz. Or around the entrance of the ear, the audio signals in that frequency range can be amplified to reach sound pressure level ("SPL") to about 80 dB. For lower audio frequencies, such as below 2 kHz, the amplification can be lower, such as 10 dB. Or for frequencies lower than 500 Hz, the maximum SPL does not have to be higher than 55 dB.

Another frequency-dependent amplification approach focuses on amplifying an audio frequency range that typically contains most of the information in everyday communication. For example, about 70% of the information in everyday human communication can be within the frequency range of 1 to 2 kHz. The frequency range that is selected to be amplified can be such a frequency range. Other frequency ranges are not selected for amplification.

There are benefits in embodiments where the ear canal remains open, with no plug inserted into the ear. For example, the user can be hearing the audio signals directly from the sender (i.e., without assistance provided by the hearing enhancement electrical components). If the embodiments further implement frequency-dependent amplification, for frequencies not within the ranges selected for amplification, the user can hear those signals directly from the sender. Lower frequencies, such as those below 2 kHz, are typically louder. Also, frequencies in the range, such as from 2000-3000 Hz, are typically in the natural resonance of the ear canal, which is typically around 2700 Hz. As a result, the intensity of these frequencies would be increased by about 15 dB. Further, with no plug inserted into the ear, there is typically no occlusion effect due to, for example, the user's own voice.

However, in embodiments with the ear canal not plugged/blocked/covered, signal processing speed of the frequency enhancement electrical components can be important. In such embodiments, the user can be hearing the audio signals both from the sender and the glasses' speakers. To prevent echoing effect, signal processing speed for hearing enhancement cannot be too low. Typically, the user would not be able to distinguish two identical sets of audio signals if the difference in arrival times of the two signals is below a certain delay time, such as 10 milliseconds. In one embodiment, the hearing enhancement signal processing speed is faster than such a delay time.

In one embodiment, the user has the option of manually changing the amplification of the system. The system can have a general volume controller that allows the user to adjust the output power of the speaker. This adjustment can also be across certain frequency bands. For example, there can be three volume controls, each for a selected frequency band.

Figure 12:
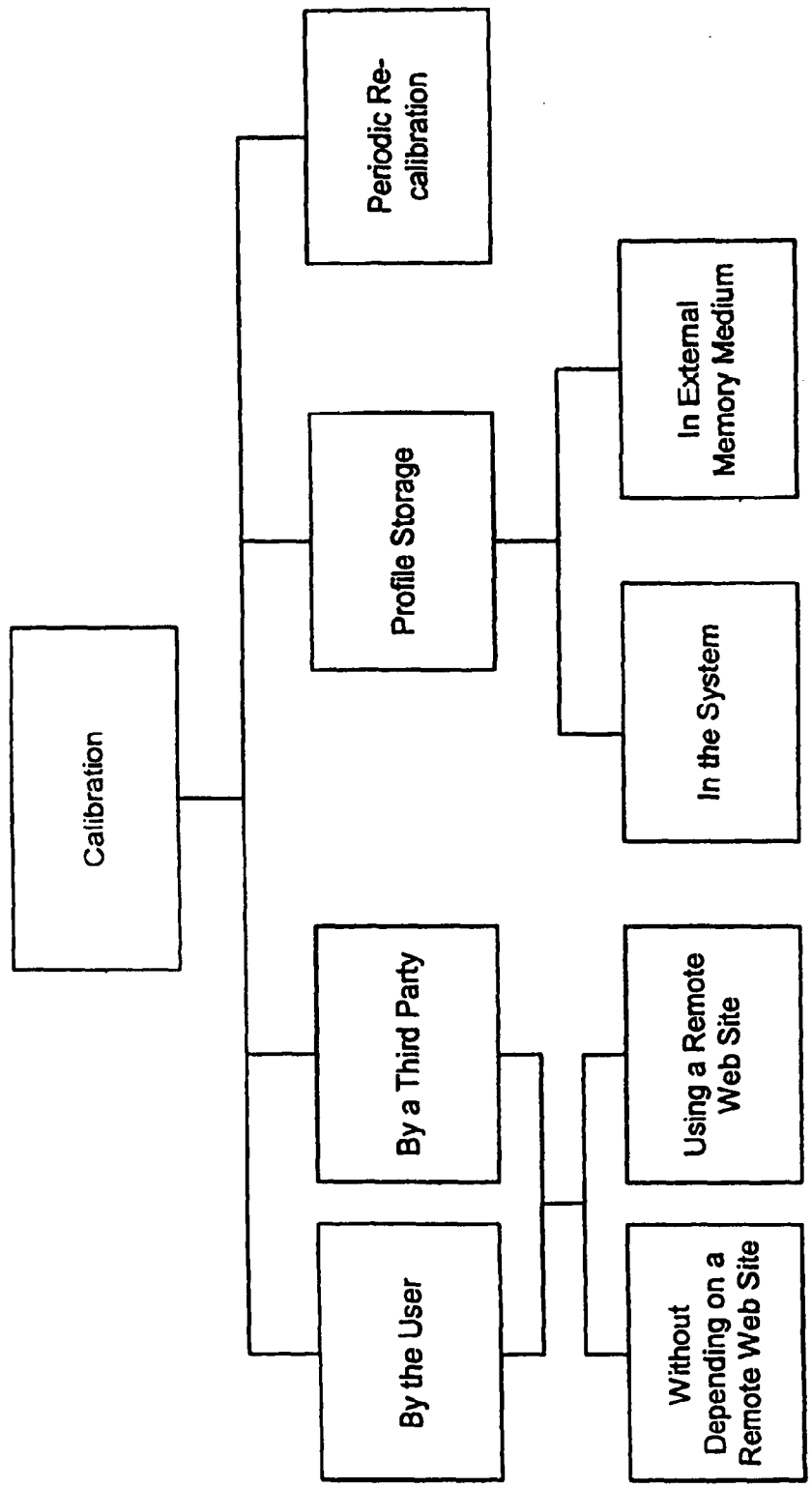
FIG. 12 shows a number of embodiments regarding hearing calibration of the present invention.

In another approach, amplification across frequencies is tailored to the hearing needs of the user. This tailoring can be performed through calibration. FIG. 12 shows a number of embodiments regarding calibration of a user's hearing, for example, across various frequencies and/or for different amount of amplification. Calibration enables the glasses to determine (e.g., estimate) the hearing sensitivity of the user. Through calibration, the user's hearing profile can be generated.

The user can perform the calibration by himself/herself. For example, the audio frequencies are separated into different bands. The glasses generate different SPL at each band. The specific power level that the user feels most comfortable would be the power level for that band. Alternatively, the glasses could generate different tones in different frequency bands. The user could compare the tones and rate the perceived loudness. In this process, the glasses can prompt the user and lead him through the process interactively. Based on the measurements, the glasses could create a calibration curve, which becomes the personal hearing profile for that user. After calibration, signals received in different bands, such as by a microphone in the glasses, will be amplified or attenuated according to the hearing profile.

In another embodiment, calibration can be done through a web site. The web site can guide the user through the calibration process. The user can be sitting in front of a computer terminal that is connected through the Internet to the web site. The terminal includes a headset that produces audio sounds. Alternatively, the user could be wearing the glasses that are connected through a cable to the sound card of the computer. The headset (or the glasses) generates different SPL at different frequency bands to test the user's hearing. The specific power level that the user feels most comfortable would be the power level at that band for the user. After testing is done for all of the bands, based on the power levels for each band, the web site creates and stores the user's personal hearing profile. Alternatively, the calibration procedure could be done offline, with software provided on a storage device, such as a disc. The software could be installed on the user's computer. After installation, the software can guide the user through the calibration process.

Note that the different calibration processes can also be done by a third party, such as an audiologist, for the user.

The user's hearing profile, which typically is represented as digital data, can be stored in the glasses, in a base, or in a portable device. After calibration, the hearing profile can be downloaded, from, for example, the above described terminal, into the glasses wirelessly, such as through Bluetooth, infrared or other wirelessly interconnection technologies, or through a wired connection. The hearing profile can alternatively be stored in a portable media storage device, such as a memory stick. The memory stick could be inserted into the glasses, the base, the portable device, or some other audio generating device, which desires to access the hearing profile and personalizes the amplification across frequencies for the user.

The glasses (or the base, or the portable device) can also periodically alert the user for re-calibration. The period can be, for example, once a year. Also, the calibration can be done in stages so that it is less onerous and/or less obvious that the user is wearing a hearing enhancing device.

In another embodiment, there can be many pairs of glasses. Each pair amplifies the received audio signals in a preset frequency range by a preset amount. For example, two pairs amplify two respectively different preset frequency ranges by 20 dB. In another set, each pair provides different amount of amplification for the received audio signals in the same preset frequency range. For example, the different amount of amplification ranges from 20 to 40 dB at 5 dB intervals for the preset frequency range of 2500 to 4000 Hz. At a store, a consumer can try out different glasses with different preset amplifications at the same or different preset frequency ranges, before buying the one the consumer prefers.

In another embodiment, there is an assortment of standard hearing profiles, such as 20 or so. The user would just pick the one that sounds best.

If the glasses include hearing enhancement capabilities, the hearing enhancement functions might be on continuously for a long duration of time, power consumption can be an issue. In yet another embodiment, the glasses also include electrical components that are for managing power consumption of other electrical components in the glasses, such as the components to enhance hearing or other functionalities in the glasses. The electrical component can be a power controller, a microprocessor, or the processor 174 in FIG. 7A. Such glasses can include power management software applications/processes to manage power consumption of the glasses.

Figure 13:
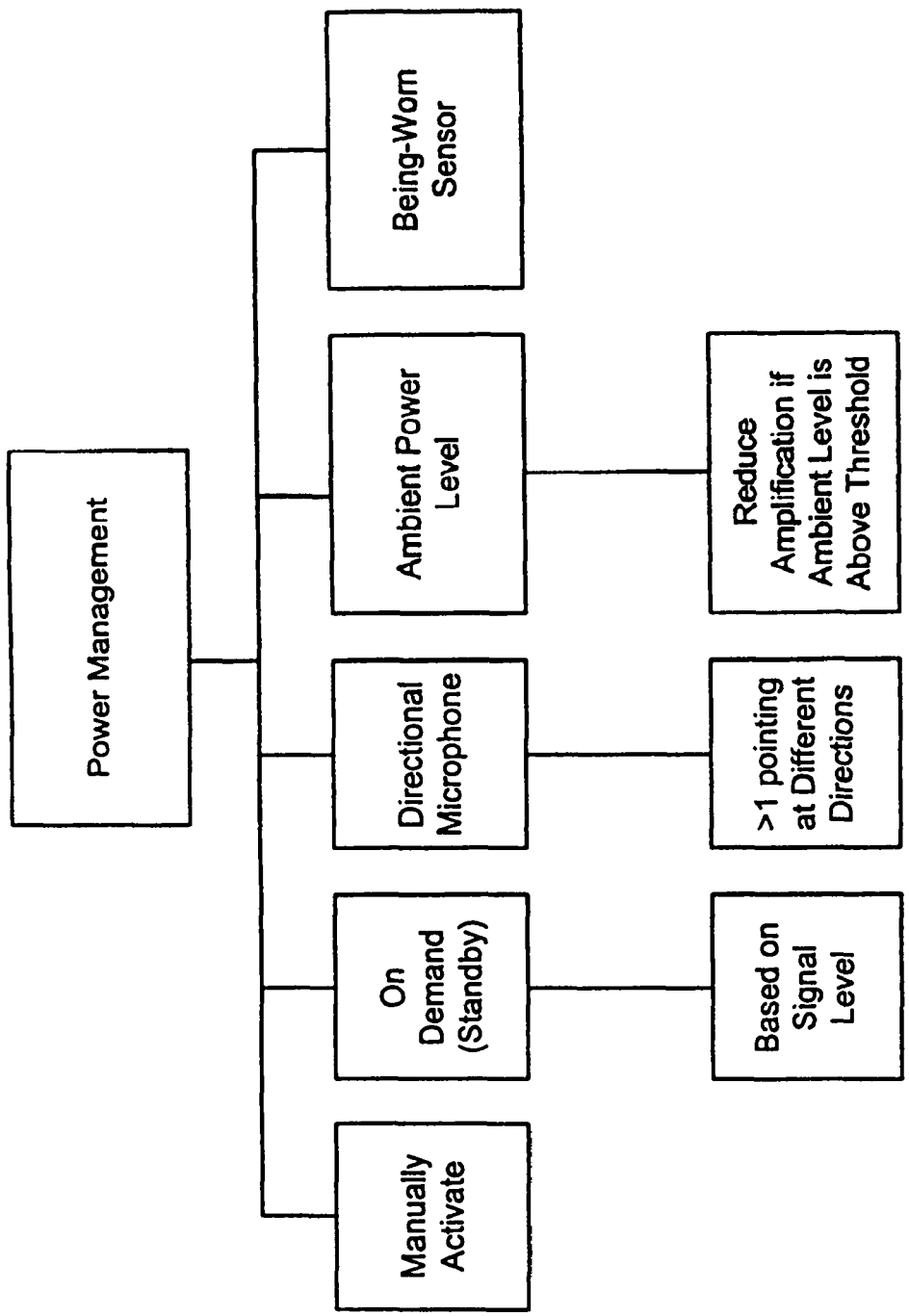
FIG. 13 shows a number of embodiments regarding power management of the present invention.

FIG. 13 shows a number of embodiments for managing power consumption of the glasses. One embodiment includes a manual on/off switch, which allows the user to manually turn off the electrical components in the glasses as he desires. The on/off switch may not have to be on the glasses. It can be on a base or a portable device tethered to the glasses.

The operation of the electrical components can be on-demand. For example, the on/off switch can be voice activated. The glasses are trained to recognize specific recitation, such as specific sentences or phrases, and/or the user's voice. To illustrate, when the user says sentences like any of the following, the hearing enhancement capabilities would be automatically turned from the sleep mode to the active mode: What did you say? Louder. You said what?

In another embodiment of on-demand power management, the glasses can identify noise (e.g., background noise), as opposed to audio signals with information. To illustrate, if the audio signals across broad audio frequency ranges are flat (not deviate more than a preset threshold amount), the glasses could assume that the received audio signals are noise. In another approach, if the average SPL of the received audio signals is below a certain level, such as 40 dB, the glasses would assume that there are no audio signals worth amplifying. In yet another embodiment, when the amplitude or the power level of the received audio signals is below a certain threshold for a duration of time, at least some of the electrical components in the glasses can be deactivated. This duration of time can be adjustable, and can be, for example, 10 seconds or 10 minutes. In another approach, only when the signal-to-noise ratio of the audio signals in the ambient is above a preset threshold, would the deactivated electrical components be activated (i.e., awakened from the sleep mode, the reduced power mode or the standby mode). In any case, to deactivate, the glasses or the hearing enhancement capabilities can be placed into a sleep mode, a reduced power mode or a standby mode.

Another approach to manage power consumption can make use of a directional microphone. This approach can improve the signal-to-noise ratio. The gain at specific directions of such a microphone can be 20 dB higher than omni-directional microphones. The direction of the directional microphone can vary with application. However, in one embodiment, the direction of the directional microphone can be pointing forward or outward away from the user. The assumption is that the user typically faces the sender of the message, and thus it is the audio signals in front of the user that should be enhanced.

In yet another embodiment of power management, the amplification of the glasses on at least a range of frequencies depends on the ambient power level, or the noise level of the environment of the glasses. One approach to measure the noise level is to measure the average SPL at gaps of the audio signals. For example, a person asks the user the following question, "Have you left your heart in San Francisco?" Typically, there are gaps between every two words or between sentences or phrases. The glasses measure, for example, the root mean square ("rms") value of the power in each of the gaps, and can calculate another average among all of the rms values to determine the noise level. In one embodiment, the glasses increase the amplification so as to ensure that the average power of the output audio signals by its speaker(s) is higher than the noise level by a certain degree. For example, the average SPL of the output audio signals from the glasses is 20 dB above the noise level.

In another embodiment, if the average power level of the environment or the ambient noise level is higher than a preset threshold value, signal amplification is reduced. This average power level can include all the audio signals received by, such as the microphone(s) of the glasses. The rationale is that if the environment is very noisy, it would be difficult for the user to hear the audio signals from the other person anyway. As a result, the glasses should not keep on amplifying the audio signals independent of the environment. To illustrate, if the average power level of the environment is more than 75 dB, hearing enhancement amplification is reduced, such as to 0 dB.

In yet another embodiment, the glasses further include automatic activation/deactivation mechanism controlled by a sensor that determines whether the user is wearing the eyeglasses. A number of such being-worn sensor embodiments have previously been described, such as in U.S. patent application Ser. No. 11/078,855, filed Mar. 11, 2005, entitled, "EYEWEAR WITH RADIATION DETECTION SYSTEM," which is hereby incorporated by reference.

Figure 14:
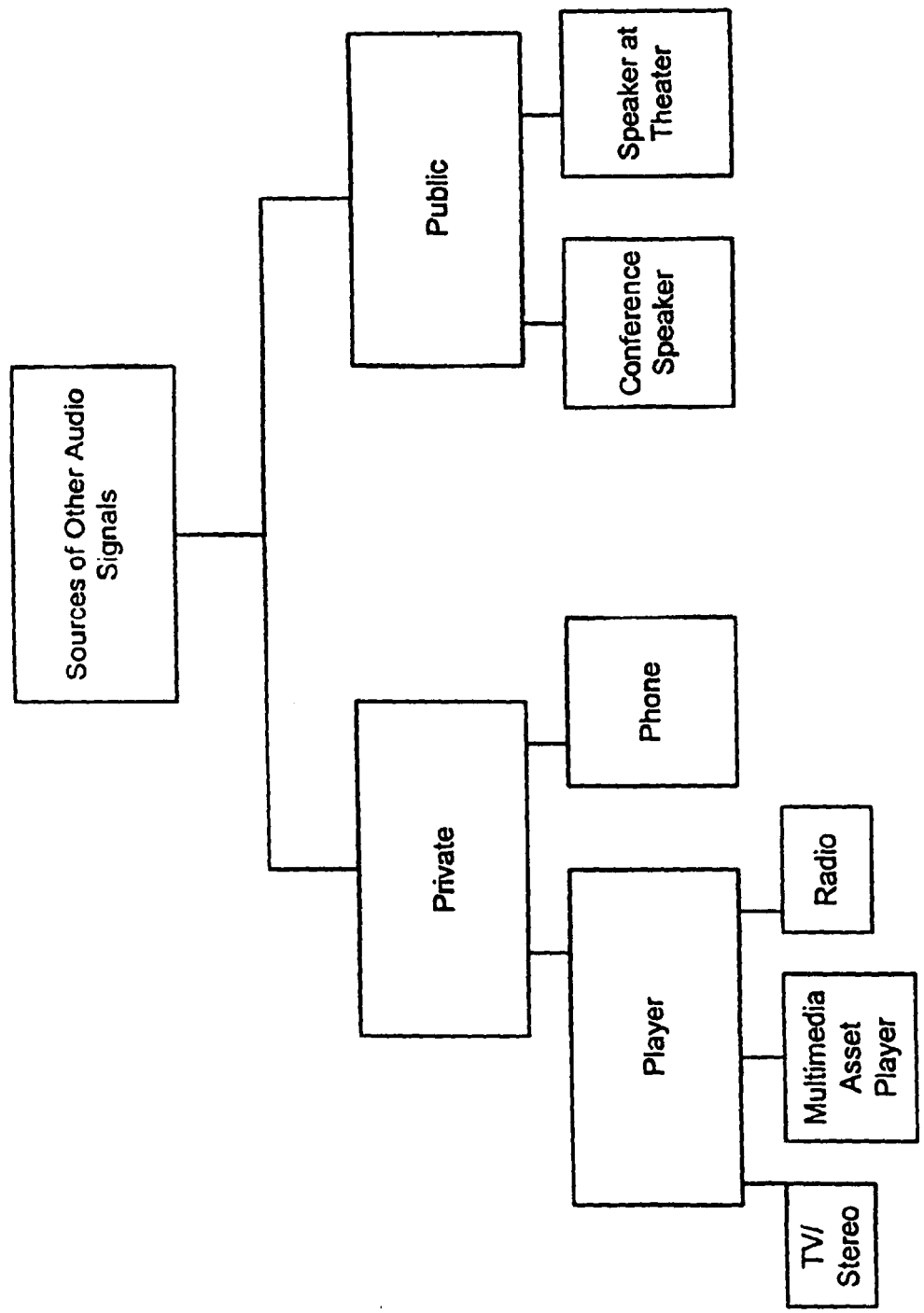
FIG. 14 shows different embodiments of sources of other audio signals generated by the glasses according to the present invention.

A number of embodiments have been described on hearing enhancement. In other embodiments, at least one electrical component in the glasses is for generating audio signals that do not originate from signals captured by the microphone(s) in the glasses. These audio signals can be known as other audio signals. FIG. 14 shows different embodiments of the sources of such other audio signals. These signals can originate from relatively private sources or public sources.

In one example of signals from private sources, the other audio signals originate from a phone call received by the glasses. Such a pair of glasses can include wireless communications electrical components of a phone. The phone can be a mobile telephone, a cordless phone, a speaker phone, a CB radio, a walkee-talkee, an intercom system or other types of phone. The wireless communications electrical components can be located in at least one of the temples of the glasses. Some of the electrical components of the phone can be in a base or in a portable device wired or wirelessly coupled to the glasses. The glasses can pick up signals from a caller, and the speaker(s) in the glasses produce the audio signals, or a representation of the audio signals, from the caller.

There can be an operation indicator on the frame of the glasses to indicate that there is an incoming call. The indicator can be based on, for example, sound, light or vibration. In one embodiment, the indication is based on light, and is located on the inside of a temple close to the hinge of that temple. Such an operation indicator can be implemented in a variety of ways, such as with a light emitting diode (LED). There can be one LED coupling to more than one optical fiber, with each optical fiber guiding the light from the LED to different areas of the frame. In the case of a LED, the operation indicator is a light source, and can produce light of the color of the LED. In another embodiment, the operation indicator could represent a small text display, such as a liquid crystal display (LCD). The indicator can also be a signal light.

In one embodiment, activation/deactivation of the phone is based on whether an incoming call is present. For example, on receiving an incoming call, the glasses can automatically activate (or wake-up) to engage in wireless communication. Activation/deactivation can also be triggered by a button provided on the frame of the glasses. The button can serve to accept or drop a call. One advantage of providing activation/deactivation is that the glasses are able to be power managed so that power consumption is reduced and the life of power sources, such as battery life, is extended.

Figure 15:
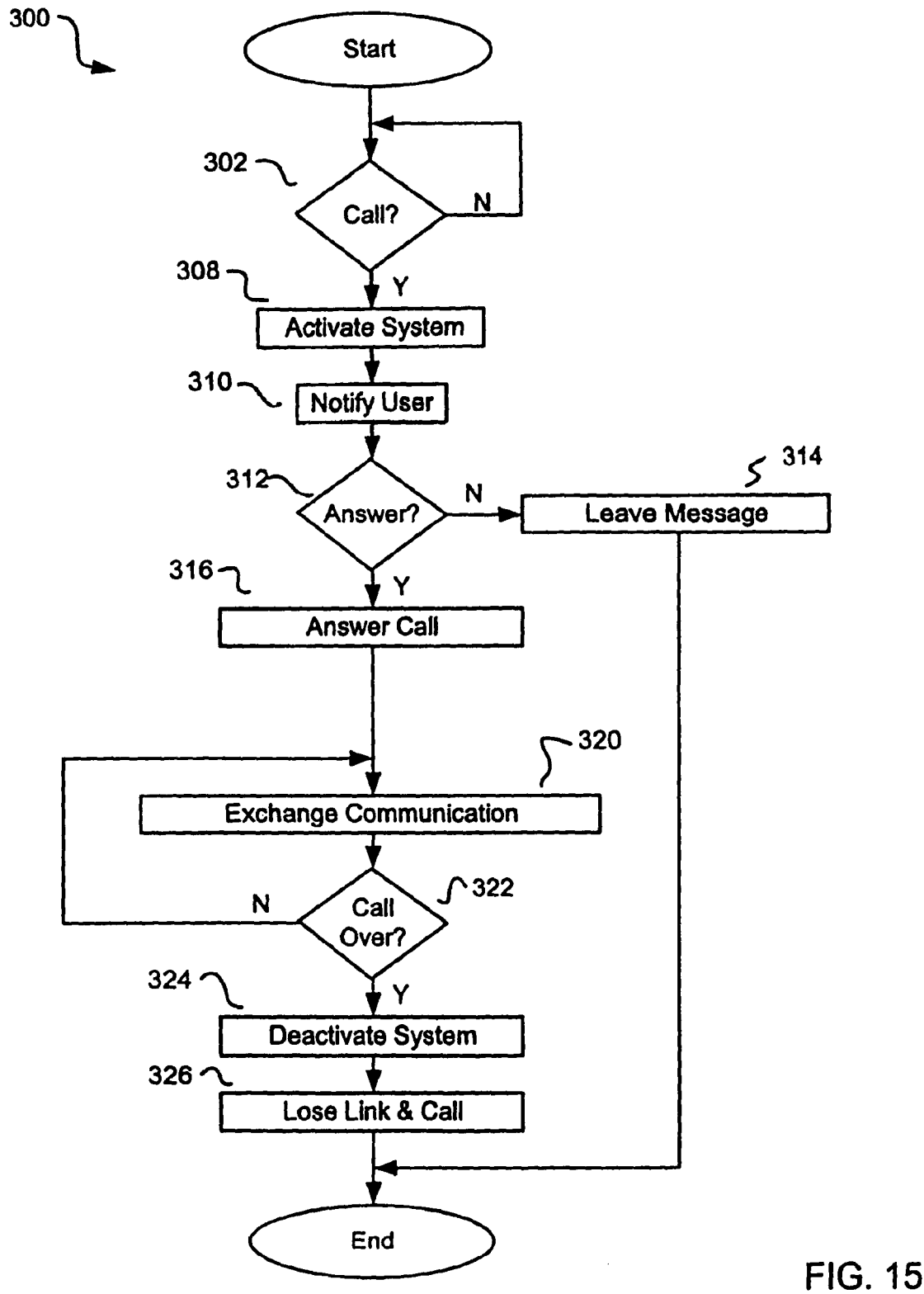
FIG. 15 is a flow diagram of call processing according to one embodiment of the invention.

FIG. 15 is a flow diagram of call processing 300 according to one embodiment of the invention. The call processing is performed using glasses disclosed in different embodiments that have wireless communication capabilities. For example, the glasses can be based on the glasses shown in FIGS. 1 or 9.

The call processing begins with a decision 302 that determines whether a call is incoming. When the decision determines that a call is not incoming, then the call processing waits for such a call. Once the decision 302 determines that a call is incoming, the glasses are activated 308. Here, the wireless communications capability of the glasses is activated (e.g., powered-up, enabled, or woken-up). The user of the glasses is then notified 310 of the incoming call. In one embodiment, the notification to the user of the incoming call can be achieved by an audio sound, such as a ringer, produced by the glasses (via a speaker). Alternatively, the user of the glasses could be notified by a vibration (such as by a base tethered to the glasses), or a visual (e.g., light) indication provided by the glasses.

A decision 312 then determines whether the incoming call is to be answered. For example, the user can push a button to indicate that the user wants to answer the call. When the decision 312 determines that the incoming call is not to be answered, the glasses can activate a voice message informing the caller to leave a message 314 or instructing the caller as to the unavailability of the recipient.

On the other hand, when the decision 312 determines that the incoming call is to be answered, the call can be answered 316 at the glasses. The user of the glasses is accordingly able to communicate 320 with the caller by way of the glasses and, thus, in a hands-free manner.

A decision 322 then determines whether the call is over (completed). When the decision 322 determines that the call is not over, the call processing returns to repeat the operation 320 and subsequent operations so that the call can continue. On the other hand, when the decision 322 determines that the call is over, then the glasses can be deactivated 324, and the call is ended. The deactivation 324 of the glasses can place the glasses in a reduced-power mode. For example, the deactivation 324 can power-down, disable, or sleep the wireless communication capabilities (e.g., circuitry) of the glasses. Following the operations, the call processing for the particular call ends.

In an embodiment where the glasses operate as a wireless headset of a portable device (e.g. a cell phone), a wireless link can be established between the headset and the portable device if the incoming call is to be answered. The wireless link is, for example, a radio communication link such as utilized with Bluetooth or Wi-Fi networks. Thereafter, communication information associated with the call can be exchanged over the wireless link. The portable device receives the incoming call, and communicates wirelessly to the glasses such that communication information is provided to the user via the glasses. When the decision determines that the call is over and the glasses are deactivated, the wireless link is also ended 326.

Regarding the hearing enhancing capabilities described, in one embodiment, when there is an incoming call, hearing enhanced capabilities are deactivated, and the glasses receives the incoming call. In another embodiment, when the user wants to receive the incoming call, one or more embodiments of the hearing enhanced capabilities enhance the audio signals from the incoming call.

One advantage of cell phones is that you can make calls anywhere you can get a signal. However, one disadvantage is that you might be making a call in a noisy environment. In one embodiment, the glasses also include electrical components for noise cancellation. Such noise cancellation functionalities can be activated during a phone conversation.

In one approach, noise cancellation is achieved through a first and a second directional microphones. The first one points at the user's mouth, and the second one points away. For example, the first one can be at one of the hinges as shown in FIG. 1, whose directionality favors sound arriving from the user. There can also be a tube from the first microphone to or towards the mouth of the user, to guide the sound from the mouth to the microphone. The second microphone can be in the vicinity of the other hinge, whose directionality favors sound arriving in front of or outside of the user. Signals received from the second microphone are subtracted from signals received from the first microphone before the audio signals are further processed for transmission as the message from the user.

Referring back to FIG. 14, other examples of audio signals originating from private sources include the other audio signals originating from different types of audio players, such as televisions, stereo systems, media asset players, or radios. The audio players can be in the glasses. In other embodiments, at least some of the electrical components of the audio players can be in a base tethered to the glasses, or in a portable device wired or wirelessly coupled to the glasses. For example, the other audio signals can originate from a portable device, which might produce, receive or play audio content. The audio content is then transmitted to the eyeglasses in a wired or wireless manner. The eyeglasses serve as a receiver of the audio content from the portable device and reproduce the audio signals for the user.

The glasses with the call processing ability perform two-way communications. In the embodiments of the glasses operating as audio players, the glasses perform one-way communications (or at least substantially one-way communications).

As an example of audio player being a stereo system, a pair of glasses includes electrical components of a headset for wirelessly receiving audio signals. Assume the user is working in the backyard and the stereo system is in the living room. The music from the stereo can be wirelessly transmitted to the glasses or to a portable unit carried by the user, which can re-transmit the music to the glasses wired or wirelessly. The speakers in the glasses can generate the music for the user to enjoy. Based on this technique, the user can enjoy the music without the need to crank up the volume of the stereo system.

In another example of an audio player, a pair of glasses includes a multimedia asset player, such as a MP3 player.

Figure 16:
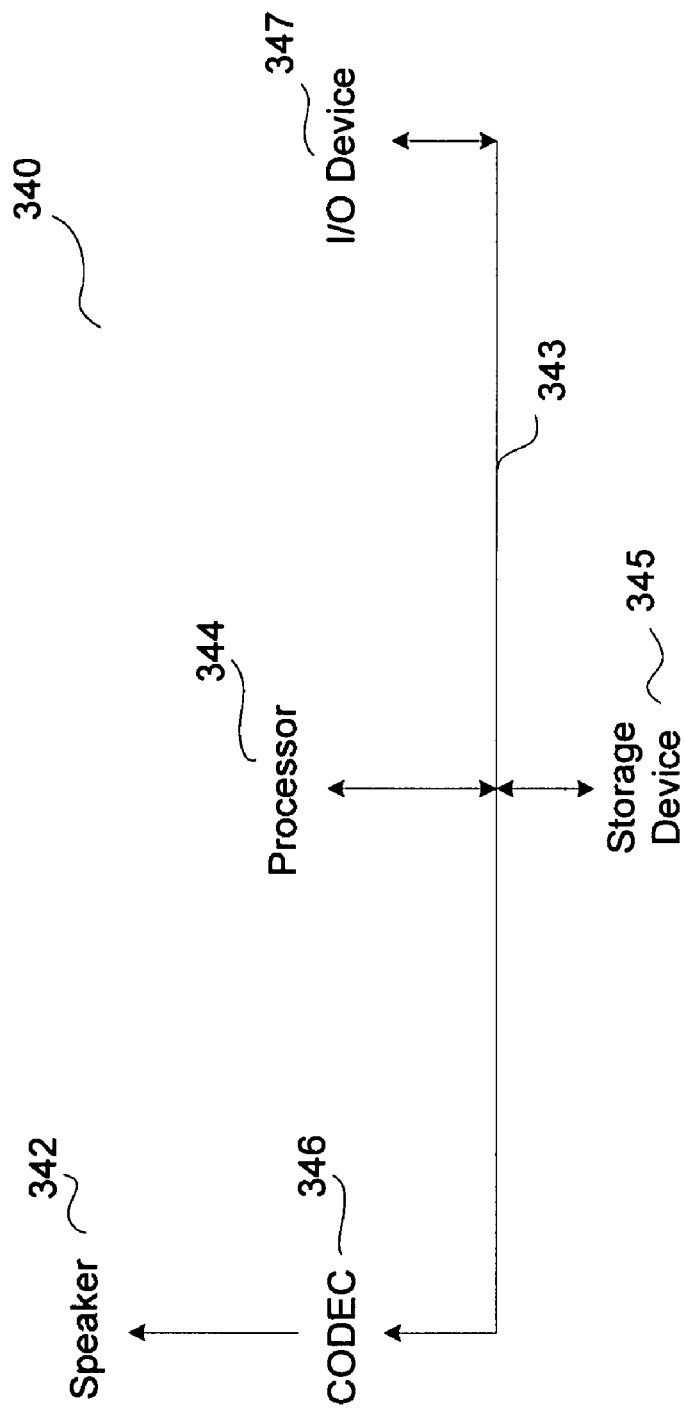
FIG. 16 shows some of the electrical components for an MP3 player according to an embodiment of the invention.

FIG. 16 shows some of the electrical components for an MP3 player 340 according to one embodiment of the invention. The player 340 includes a speaker 342 and a data bus 343, which facilitates data transfer among, for example, a processor 344, a storage device 345, and a coder/decoder (CODEC) 346. The processor 344, which can be a microprocessor or controller, controls the operation of the player 340. The storage device 345 stores the multimedia assets, such as MP3 files, or other types of media data that are appropriately formatted. In one example, the MP3 files are digitally encoded songs or other types of audio signals. The storage device 345 can include a number of separate storage elements. For example, the device 345 can be a flash memory device, or a minidisk device, and a cache, which can improve the access time and reduce power consumption of the storage device 345. The storage device 345 typically also includes a Read-Only Memory (ROM), which stores programs, utilities or processes to be executed in a non-volatile manner. The player 340 can also include a RAM, such as for the cache.

Once a media asset, such as a song, is selected to be played, the processor 344 supplies the asset to the CODEC 346, which decompresses the asset and produces analog output signals for the speaker 342. In one embodiment, the bus 343 is also coupled to an input/output device 347, which could, for example, allow a user to upload songs in the glasses to an external instrument, such as a computer; or download songs from the instrument to the glasses.

There are different approaches to select a song. In one embodiment, the media assets/songs can be categorized in the asset player. The categorization can be based on the names of artists, albums and/or songs. The categorization can be hierarchical, with multiple levels in the hierarchy. To illustrate, assume that there are three levels. The top level can be the name of a singer; the second level can be the time periods when the assets were produced, and the third level can be the names of the songs. The entries, such as the name of the singer, can be abbreviated. There can be a small display and a control knob to allow a user to scroll down entries in a level. By pushing the knob, the user selects an entry, which can lead the user to a lower level. There can be an entry for moving up a level also. In another embodiment, the display is a touchscreen display, allowing entries to be entered directly on the display. In yet another embodiment, entries can be selected based on voice recognition.

Figure 17:
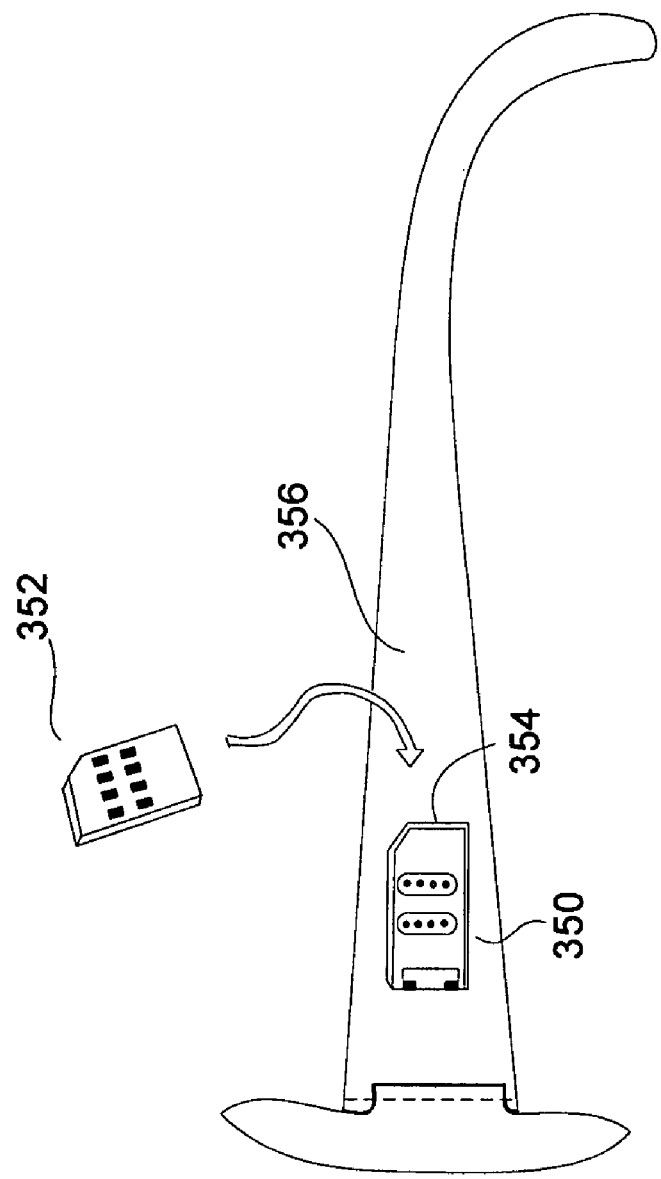
FIG. 17 shows one embodiment of the invention that has a card with electrical components coupled to a pair of glasses through a connector at a temple of the glasses.

All of the electrical components of the asset player, such as the MP3 player, do not have to be fully embedded in the glasses. In one embodiment, at least a portion of the MP3 player can be coupled to the glasses through a connector at the glasses. FIG. 17 shows a card connector 350 to receive a card 352, such as a removable media card (e.g., memory card). There can be a cover 354 to secure the media card in place after it is inserted into the card connector. The cover 354 can also protect the card once the card is in the card connector. The connector 350 can be, for example, at a broad side of a temple 356, as shown in the figure. The card can be for an MP3 player. It can be a memory card for a MP3 player, with the speaker of the player in the temple 356. The speaker can play the multimedia assets accessed from the card through the connector. In another embodiment, some of the electrical components of the different types of audio players can be in a portable device, wired or wirelessly coupled to the glasses.

FIG. 1 shows two speakers, one speaker at one of the temples. In embodiments regarding generating other audio signals, the two speakers can provide stereo effects. There can also be more than one speaker at each temple. The glasses can provide four or more speakers to give a high fidelity sound or a surround sound effect. For example, each temple can include one speaker close to the hinge, and one speaker close to the tip of that temple or its temple tip. In one embodiment, a temple tip is separable from its temple. In other words, the temple tip is a replaceable part. In another embodiment, a temple tip is an integral part of its temple. The different speakers can generate different portions or sections of the sound. Further, if a base or a portable electronic device is coupled to the glasses, the base or the portable electronic device can contain another speaker, such as a base or woofer speaker. Such embodiments enable the glasses to provide a personal high-fidelity sound or a surround-sound environment.

In one embodiment, the audio player can be a radio. The glasses include the electrical components of a radio. There can also be switches on the glasses to control the operation of the radio. For example, one switch is an on/off switch, which can also change the volume of the radio. This switch can be a roller switch or can be based on two switches (one for moving up and the other moving down). Another switch can be a push button, which when pushed will reset the radio to a specific station, such as 88 MHz. A third switch is another push button, which when pushed will scan up to the next station, relative to the previous station. Different types of control knobs or switches will be further described below.

Figure 18:
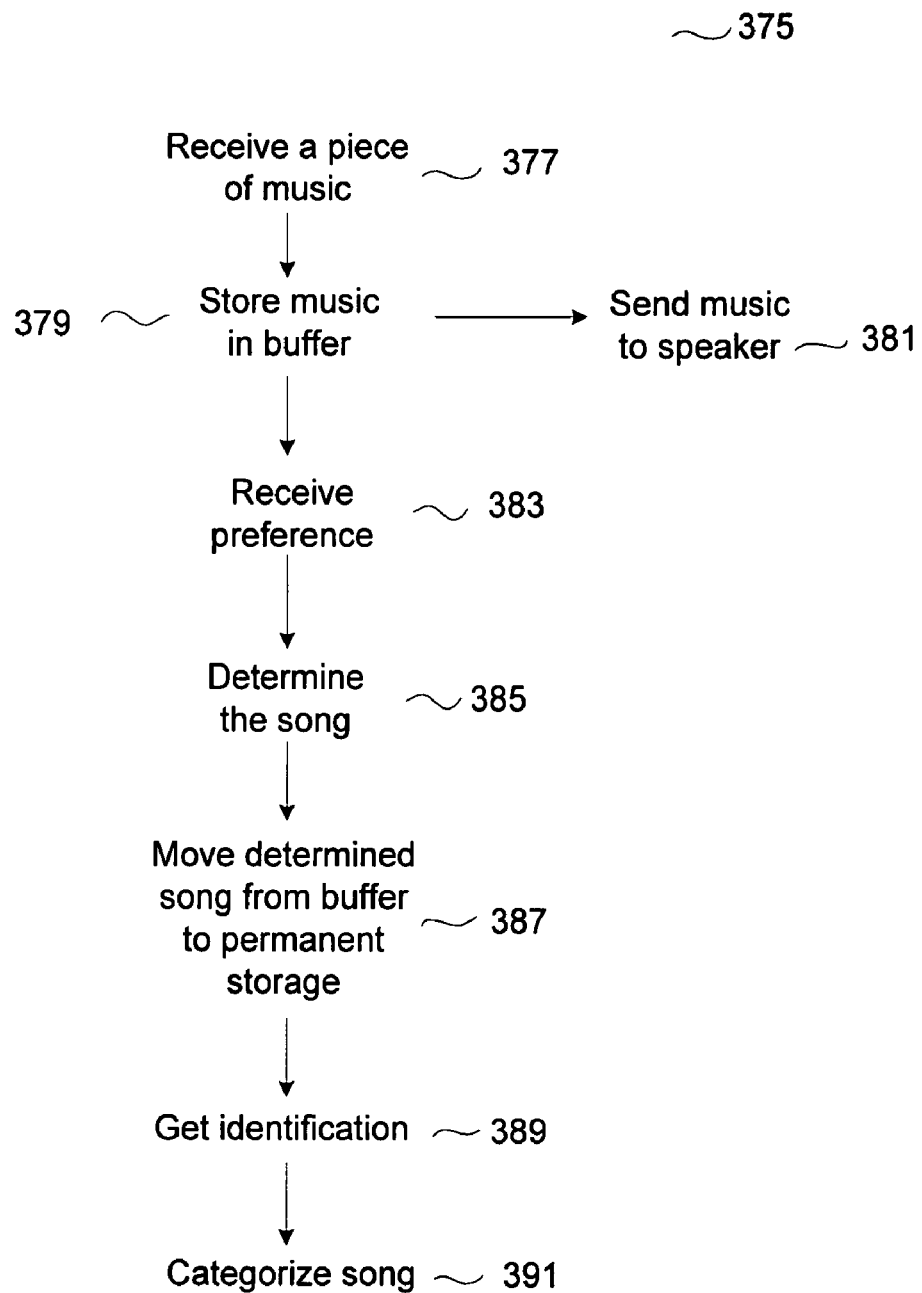
FIG. 18 shows a process for a personalized radio according to one embodiment of the present invention.

In one embodiment, the radio is a personalized radio that is personalized to the user. For example, the radio keeps track of at least one preference of the user regarding audio signals from the radio received by the user. FIG. 18 shows a process 375 according to one embodiment for a personalized radio. Initially, a pair of glasses according to the invention receives 377 a piece of music from a radio station. That piece of music is stored 379 in a buffer or a temporary storage area. This temporary storage area can be in the glasses or tethered/coupled to the glasses. The piece of music is also sent 381 to a speaker in the glasses.

Assume that the user likes the music. Based on a preference indicator, the user shows his preference. After the glasses receive 383 an indication that the user likes the music, the glasses determine 385 the song corresponding to the indication. That piece of music can then be moved 387 from the buffer to a permanent storage area, such as into a flash memory. The beginning and the end of the piece of music can be identified based on additional information embedded with the piece of music. There can be meta data tied to the music keeping such additional information. With the piece of music stored in the permanent storage, the user can subsequently access it as desired.

There are different ways to determine the song or the content being played by the radio being the one preferred by the user. For example, one way/rule is that when the user pushes a specific button (a preference button) on the glasses or voices his preference, the song (or media asset or media file) that is being played at that point in time is the one the user likes. Since an operating system can be responsible to send the music to the speaker, the operating system knows what song is being played at that time. Based on the rule, the song of preference is determined when the button is pushed. Another rule is that when the user shows his preference, and there is no song being played at that instance, the song immediately preceding the break is the song of preference.

In another embodiment, the glasses can get 389 an identification for the song the user likes. For example, the glasses can ask the user to provide an identification for the piece of music. This identification can be the type of music, the name of the singer/artist, the name of the music, the name of the album or other identification. In another embodiment, there can be meta data embedded, such as in the beginning part of the music (or media asset). Having such meta data embedded is not uncommon for music in digital format. The meta data can include identifications for the music. The glasses can get such identification. Based on the identification, the song is categorized 391 accordingly, such as grouped with other songs having the same identification. Such categorization process would enhance the ease of accessing the song by the user at a later time.

In one embodiment, when the user activates the different types of audio players, the hearing enhancement mode is deactivated. In another embodiment, when the user activates the different types of audio players, one or more features of the hearing enhancement capabilities operate on the audio signals from the audio players. In other words, different embodiments of the hearing enhancement capabilities previously described can be activated or deactivated on the audio signals from the different types of audio players.

Referring back to FIG. 14, regarding public use, the audio signals generated by the speakers can originate from a public source. The public source can be a source that generates the audio signals for many people, or for people in a public environment. For example, the user can be at a conference or a theater. In one embodiment, the glasses can be coupled to the conference microphone or the theater speaker wirelessly, and are capable of capturing the audio signals therefrom. Again, the coupling can be through a portable device wired or wirelessly connected to the glasses. Then the glasses re-generate the corresponding audio signals for the user. Again, different embodiments of the hearing enhancement capabilities previously described can be activated or deactivated on the audio signals from the public sources.

Figure 19:
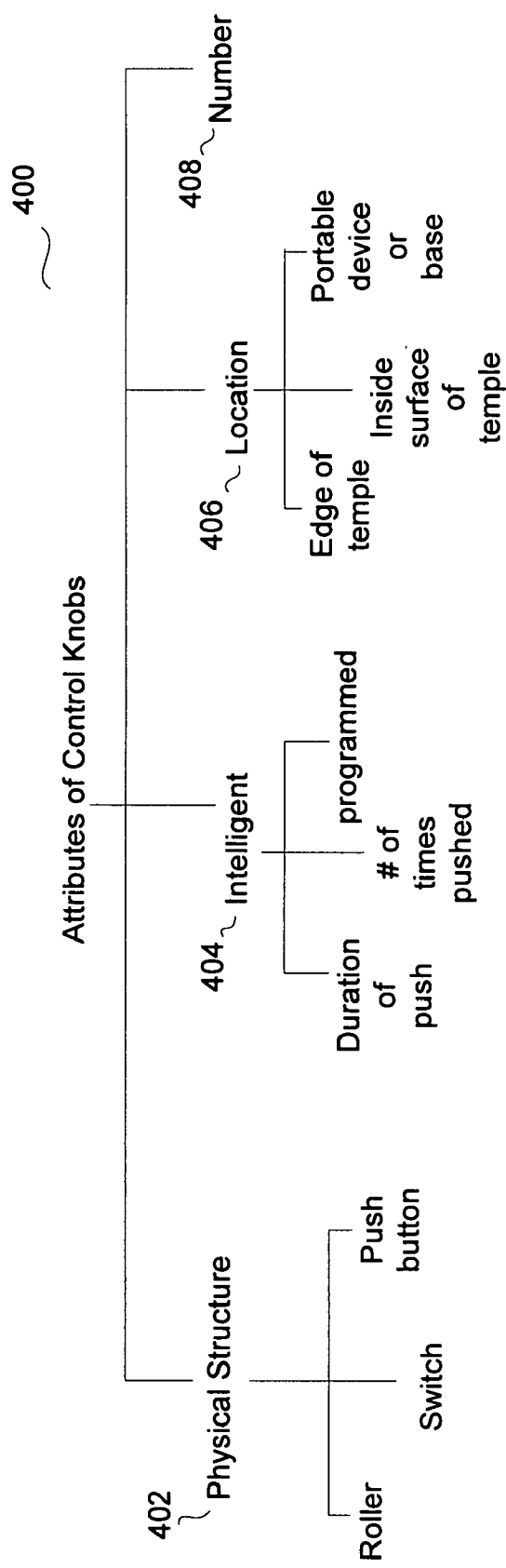
FIG. 19 shows a number of attributes of control knobs according to different embodiments of the present invention.

There can be one or more control knobs or switches at the glasses for controlling the operation(s) of the glasses. FIG. 19 shows a number of attributes 400 regarding control knobs. The knobs can be of different physical structure 402. For example, a control knob can be a roller, a switch or a push-button. A control knob serving as an up/down controller can use two buttons (one for up and the other for down), or a roller (rolling in one direction being up and the other direction being down).

A control knob can include additional intelligence 404. For example, a push-button control knob can serve different purposes depending on the duration the knob is being pushed. If a user pushes it for more than three seconds, the knob serves as an on-off toggle switch for the glasses. In another example, a knob can serve multiple purposes, and the specific purpose depends on the number of times the knob is pushed non-stop.

A knob can also be programmed by a user. A user can connect the glasses to a computer and program the knob accordingly. For example, one can program a knob such that if the knob is pushed for more than three seconds, the knob would serve as an on/off switch for the glasses.

The location 406 of a control knob can vary for different applications. A control knob can be located on the glasses. A control knob can be on the top, the side or the bottom of a temple of the glasses. A control knob can be located at the inside of a temple facing the user.

Assume that there are a number of control knobs and all of them are on the edges of a temple, except one. By being at a position substantially different from other control knobs, this knob can serve a specific purpose. For example, it can be an on/off control knob for all of the electrical components in the glasses.

In yet another embodiment, a control knob can be located in a portable device wired or wirelessly coupled to the glasses, or in a base tethered to the glasses.

The number 408 of control knobs can vary depending on operations. For example, there is an on/off control knob and a volume up/down control knob. If the glasses are used for cell phone headset applications, in one embodiment, there is also an answer/hang-up control push-button. If the glasses serve as a radio, in one embodiment, there is also a channel selection control knob, which can be an up/down controller, like two push buttons. If the glasses serve as a CD player, in one embodiment, there is a play control knob, a stop control knob, and a skip forward/backward control knob. If the glasses serve as a multimedia asset player, such as a MP3 player, in one embodiment, there is a skip-forward/backward-song control knob and a select-song-to-play control knob.

In a number of embodiments described, a pair of glasses can serve different applications. For such embodiments, a switch on the glasses (a base or a portable device coupled to the glasses) can also serve different functions, depending on the application.

Different types of switches are applicable for different applications. Additional disclosures on switches are in U.S. Provisional Application No. 60/583,169, filed on Jun. 26, 2004, which is hereby incorporated by reference.

Figure 20A:
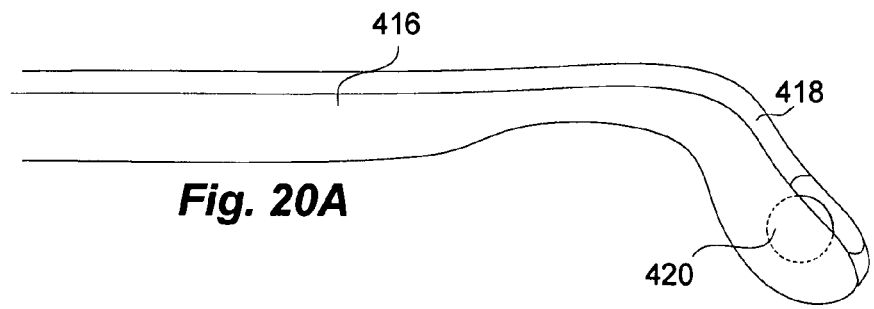
FIGS. 20A-20C illustrate different embodiments of power sources for a pair of glasses according to the invention.
Figure 20B:
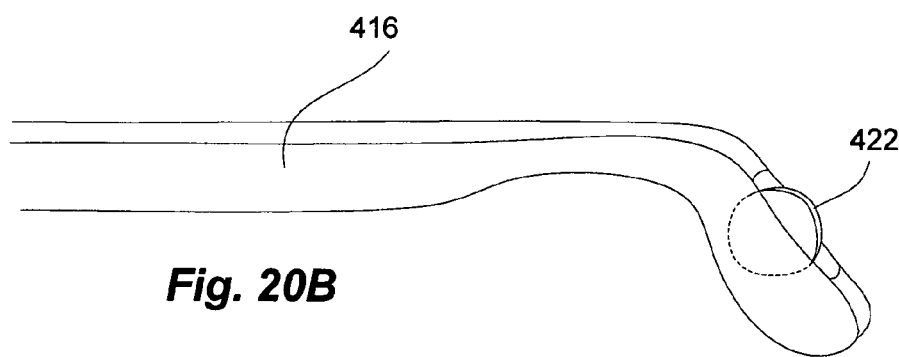
Figure 20C:
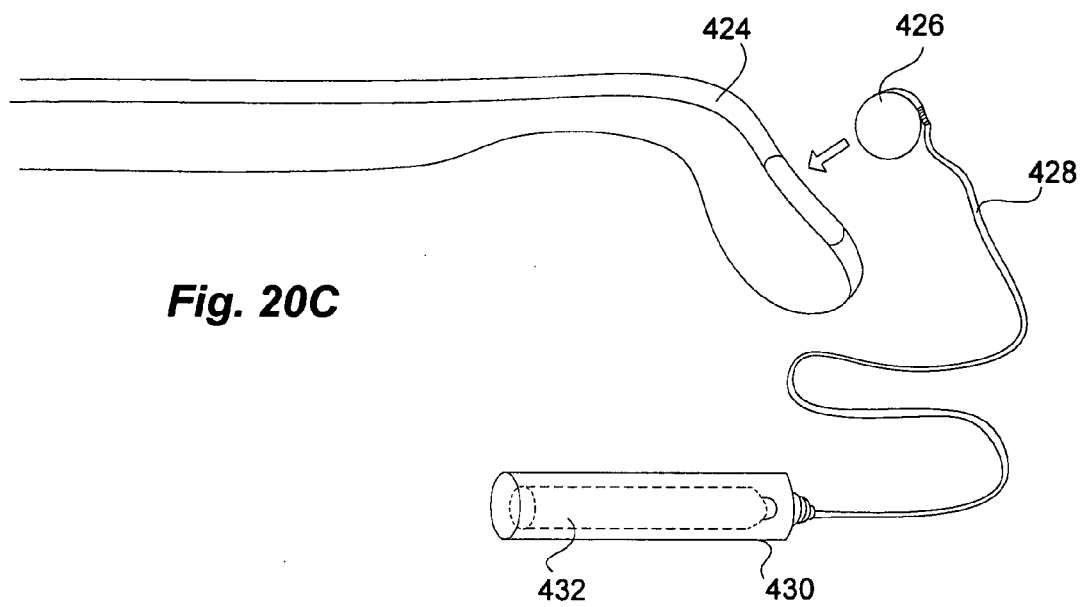

Regarding power sources for electrical components, in one embodiment, the power sources, which can be batteries and/or solar cells, are in the glasses. In another embodiment, one or more batteries can be inserted into the glasses. The batteries can be of various sizes and types. For example, as shown in FIG. 20A, a coin battery 420 (e.g. CR1025) can be inserted into the tip section or the free end of one of the temples 416. FIG. 20B shows the embodiment shown in FIG. 20A with a bigger coin battery 422 (e.g. CR2032) inserted into the slot. Since the size of the battery is bigger than the size of the slot, a portion of the battery 422 sticks out of the slot. FIG. 20C shows another embodiment of the glasses that include a slot/cavity to receive a battery adapter 426. The slot 418 in FIG. 20A can be the same as the slot 424 in FIG. 20C. The adapter 426 can be the same size and shape of the battery shown in FIG. 20A, and with two terminals, just like the battery. However, the adapter, by itself, is not an energy source. The adapter is connected to a cable 428, with at least two wires inside, one for each terminal of the adapter. The adapter 426 is inserted into the cavity 424 of the glasses, and is coupled through the cable 428 to a case or a capsule 430 that holds a battery 432. The two wires in the cable 428 are for the two terminals of the battery 432. The size and capacity of the battery held by the capsule can be bigger than the coin battery, and could be less expensive than the coin battery. In one embodiment, the capsule 430 holds an AA battery. Note that in one approach, the temple in FIG. 20C is the same as the temple in FIG. 20A. In yet another embodiment, the power sources are in a base or a portable device connected to the glasses through a wire connection, and the power sources can be rechargeable.

In a number of embodiments, some of the electrical components for hearing enhancement and/or for generating other audio signals are in a base tethered to the glasses. In other embodiments, some of the electrical components are in a portable device, wired or wirelessly coupled to the glasses. In yet other embodiments, all of the electrical components are in the glasses.

In different embodiments, the glasses can be a pair of sunglasses, auxiliary frames, fit-over glasses, prescription glasses, reading glasses, safety glasses, swim masks, or goggles, such as ski goggles.

In a number of embodiments, the frames of the glasses have more surface area than frames with minimal structure, such as those frames with lenses connected together by wires. For example, the temples of the glasses can have a taper profile. Each of the temples can be wider or broader when it is close to its corresponding joint. In one embodiment, the temple is wider or broader by spanning across a wider or broader area longitudinally down, creating a bigger surface somewhat parallel to the face of the user. FIG. 1 shows an example of such an embodiment.

In another embodiment, there can be a shield at least at one of the edges of each of the lens holders of the glasses. These shields can wrap around, or better conform to the profile of, the face of the wearer. The shields can be opaque. There can be transparent or translucent windows on these shields. To illustrate, in fit-over sunglasses, when worn over a pair of prescription glasses, such shields can go over or cover at least a portion of the pair of prescription glasses. Note that in one embodiment, a pair of glasses does not have to include lenses.

A number of embodiments have been described with electrical components in the temples of the glasses. In yet another embodiment, at least one electrical component is in other parts of the glasses, such as in a shield, the bridge or a lens holder of the eyeglasses.

A number of embodiments of glasses have been described where the glasses include hearing enhancement capabilities and can generate one or more types of other audio signals.

Note that electrical components for such functionalities can be shared. For example, different functionalities can share the same power source, or the same processor/controller.

Though a number of embodiments of glasses have been described where the glasses with hearing enhancement capabilities also generate other audio signals, different embodiments of the glasses only have hearing enhancement capabilities. In yet other embodiments, the glasses do not have hearing enhancement capabilities, but generate other audio signals.

In one embodiment, the glasses function as a headset and are adaptable for different applications, such as hearing enhancement, communication (e.g. phone operation) or listening to other audio signals (e.g. MP3 operation). The user initially can use the glasses as the headset for a phone or an MP3 player. Later, as the user's hearing degrades, the user can use the glasses as the headset for hearing enhancement or hearing boosting. In any event, when a person is using the headset, a third party may not be able to tell whether the person is having his hearing enhanced, or listening to other audio signals.

With the glasses functioning as a headset, in one embodiment, the glasses can include a connector and two speakers, one at each temple, both electrically connected through a conductor embedded in the glasses. The conductor can be a wire, similar to the embodiments shown in FIGS. 5A-5B. The connector can be located at the free end of one of the temples, such as the embodiment shown in FIG. 8. The connector can be a standard connector, such as a 3-wire or three terminal plug, or a 3.5 or 2.5 mm male stereo mini-phone plug. The three terminals can be for the two speakers and ground, with both speakers sharing the same ground. In one approach, the positive terminal of the left speaker is connected at the first terminal of the plug, the positive terminal of the right speaker is connected to the second terminal of the plug, and the ground terminals of the speakers are connected to the third terminal of the plug.

The plug at the glasses can be used to receive stereo signals for the two speakers. The stereo signals can be from a separate audio source, such as an MP3 player or a radio. There can be an audio cord that has a male stereo connector at one end and a female stereo connector at the other. The female connector of the cord is for receiving the plug at the glasses, while the male connector of the cord is for inserting into the headset jack of the player or the radio.

Figure 21A:
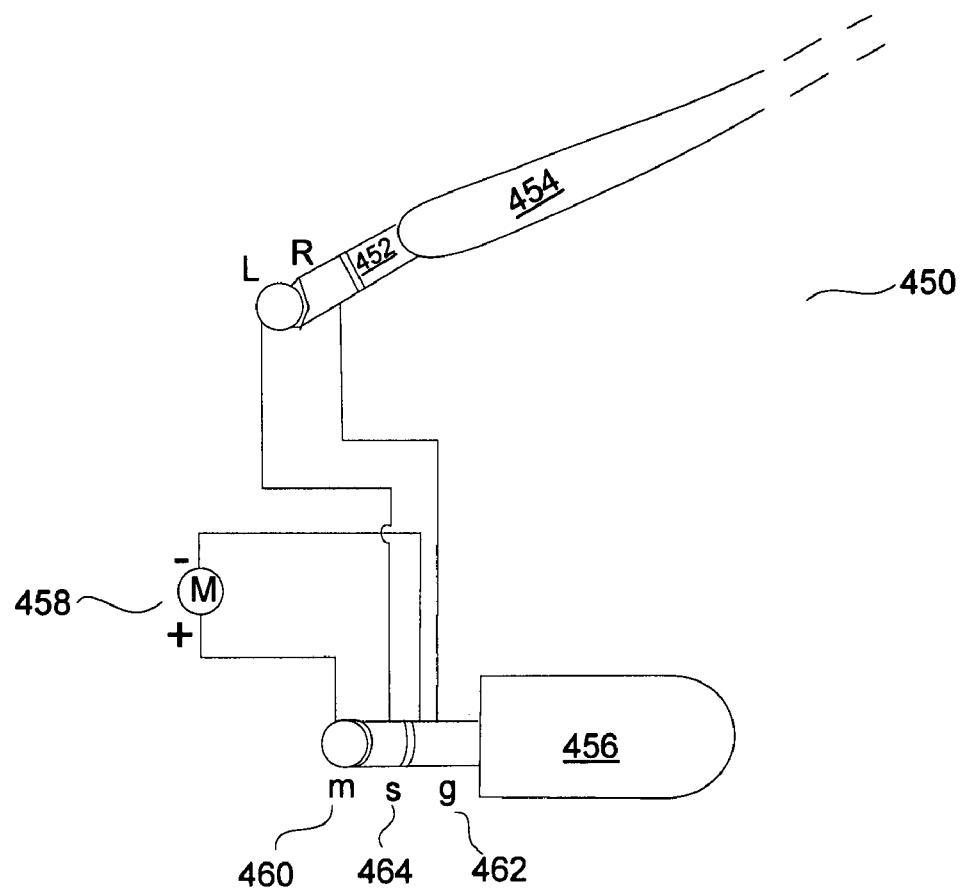
FIGS. 21A-21B show different embodiments of headset-to-phone cords according to the present invention.
Figure 21B:
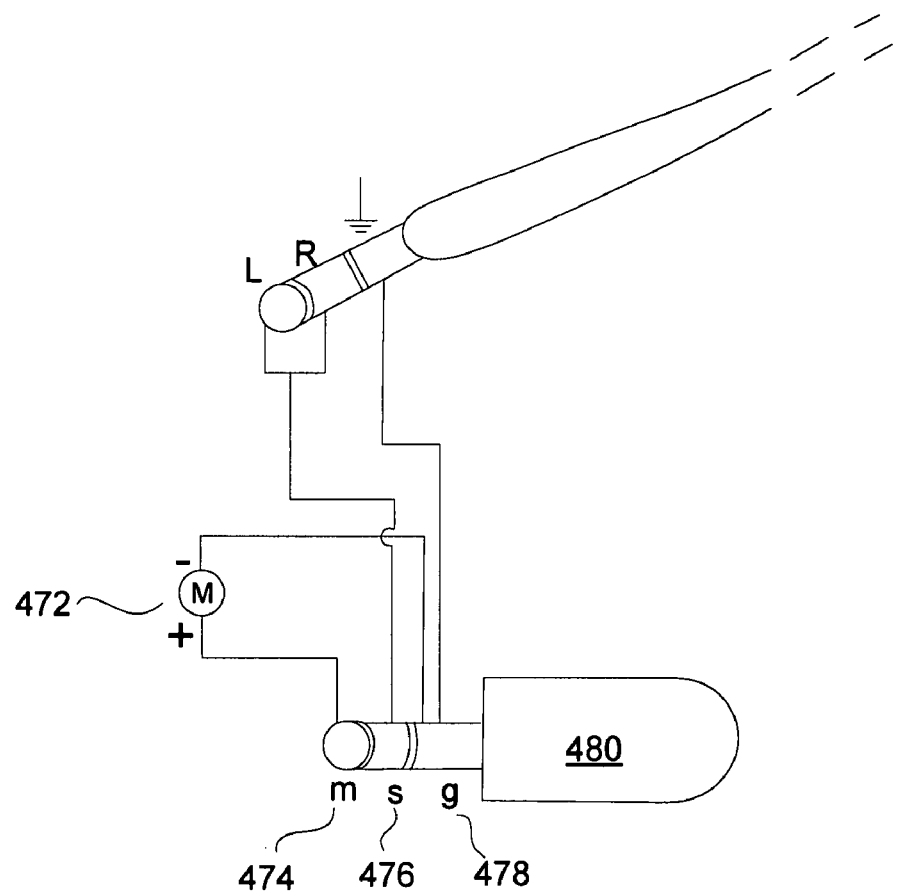

The headset can be used as the headset for a cell phone. Phone calls can be made with the headset using a headset-to-phone cord. FIGS. 21A-21B show two embodiments of such a cord. The cord includes a female stereo mini-phone jack at one end and a male stereo mini-phone plug at the other end. The three terminals at the stereo mini-phone plug can be designated as the m (microphone), s (speaker), and g (ground) terminals.

FIG. 21A shows one approach 450 for the wiring connections in a headset-to-phone cord. One end of the cord can have a female stereo mini-phone jack for connection to the plug 452 at a temple tip 454 of a pair of glasses. The female jack is not shown in FIG. 21A. The other end of the cord 450 has a stereo plug 456, with three terminals, the m 460, the s 464 and the g 462 terminals. The plug 456 is for inserting into the headset jack of the phone. In the approach shown in FIG. 21 A, the two speakers in the glasses are connected in series, and the microphone 458 for the phone is attached to the cord, similar to the microphone 254 shown in FIG. 9.

Regarding wiring connections in the cord 450, the microphone 458 is connected with wires between the m 460 and the g 462 terminals for the user to speak into. Note that in this embodiment, the negative terminal of the microphone 458 is extended through a wire to connect to the ground terminal 462 within the plug 456. The positive terminal for one speaker is connected to the s 464 terminal, and the positive terminal for the other speaker to the g 462 terminal. The two negative terminals of the two speakers are connected together (such as inside the glasses) to complete the circuit. In this embodiment, both speakers are connected in series and the audio signals of the caller go through both of them.

FIG. 21 B shows another approach 470 for the wiring connections in a headset-to-phone cord. In this approach, the two speakers in the glasses are connected in parallel. A microphone 472 is connected between the m 474 and the g 478 terminals. The negative terminal of the microphone 472 is extended through a wire to connect to the g 478 terminal at a location within the plug 480. The positive terminals for both speakers are connected to the s 476 terminal, and the negative terminals of both speakers to the g 478 terminal. Again, the microphone 472 is external to the glasses and is attached to the cord 470.

Based on such headset-to-phone cords, the glasses can be used as the headset of a telephone, such as a cell phone. Also, based on the headset-to-phone cords, the headset can be used for hearing enhancement, with the microphone in the cord, external to the glasses.

Figure 22:
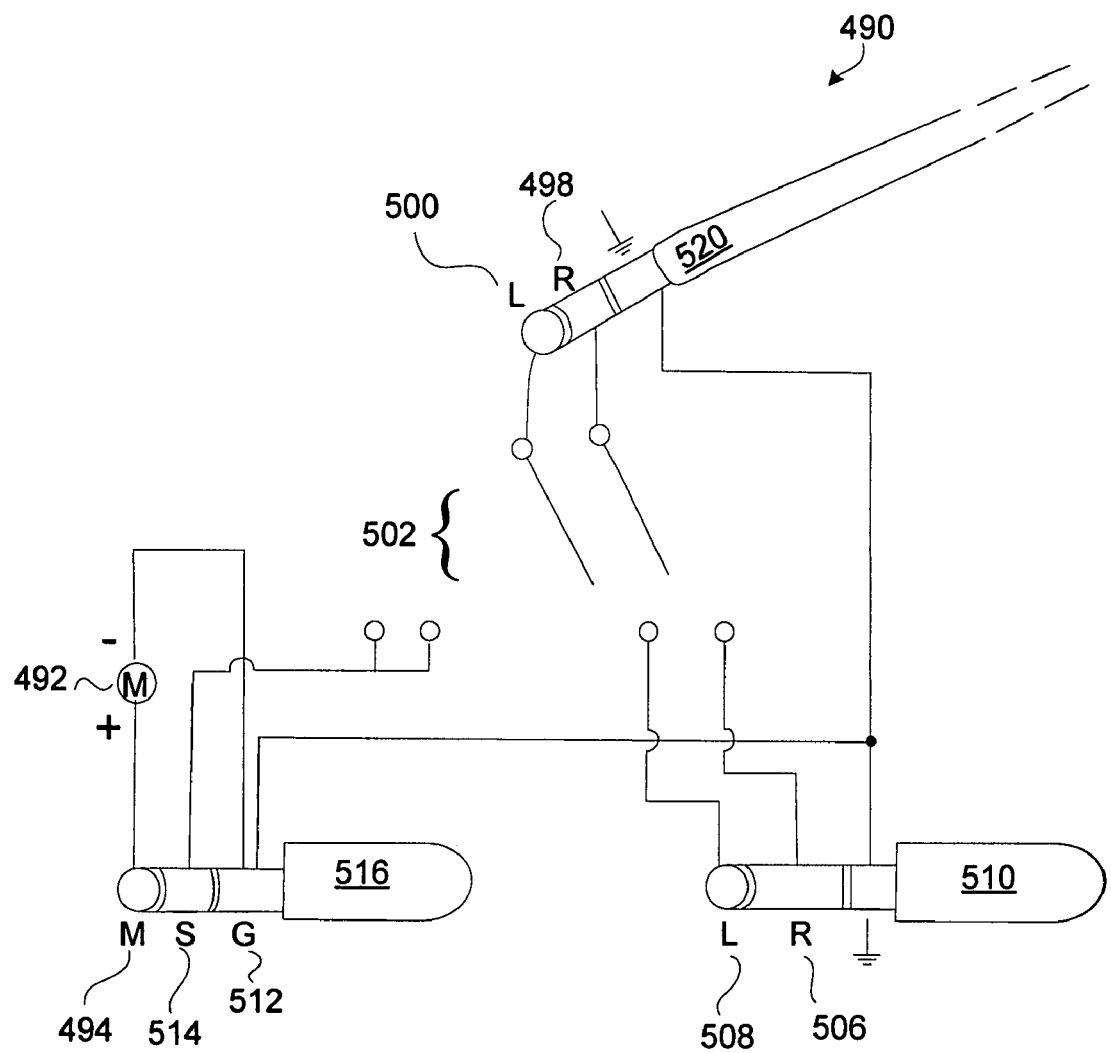
FIG. 22 shows an embodiment of the invention of a cord with a switch for both a cell phone and a player.

Note that the audio cord and the headset-to-phone cord can be combined. FIG. 22 shows a combined cord 490 that can perform both functions. The example shown in FIG. 22 assumes the two speakers in the glasses being connected in parallel. Again the microphone is attached to the cord, external to the glasses.

As shown in FIG. 22, one end of the cord can have a female mini-phone jack to be connected to the plug 520 at a temple tip 522 of a pair of glasses. That female jack is not shown in FIG. 22. The combined cord 490 includes a switch 502. One switch position is to connect the speakers to a stereo plug 510. This is the position where the cord 490 functions as an audio cord. The other switch position is to connect the speakers to a stereo plug 516. This is the position where the cord 490 functions as a headset-to-phone cord.

With the switch 502 in the audio cord position, the right 498 and left 500 speaker terminals of the plug 520 are connected to the right 506 and the left 508 terminals of the male stereo connector 510.

With the switch 502 in the headset-to-phone cord position, the right 498 and left 500 speaker terminals are connected to the s 514 terminal of the male stereo connector 516. The microphone 492 is connected between the m 494 and the g 512 terminals of the stereo plug 516. When the plug 516 is inserted into a phone jack, the negative terminal of the microphone 492 is connected to the ground of the phone.

Figure 23:
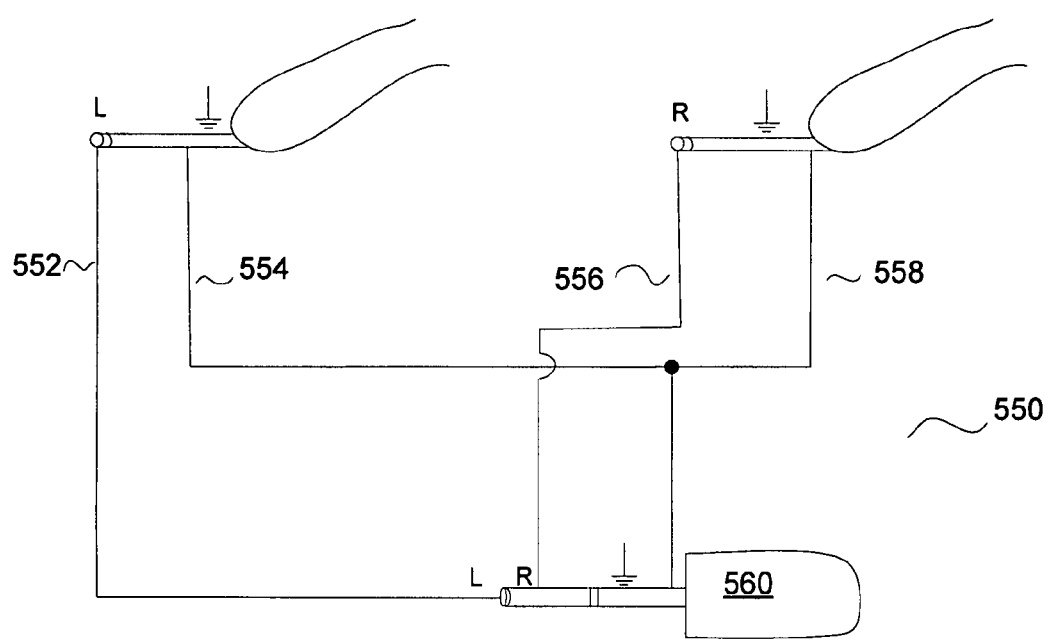
FIG. 23 shows one embodiment of a mono-plugs-to-stereo-plug adapter cord according to the invention.

Instead of having just one connector at the glasses, there can be two connectors. Each connector can be located at one of the temple tip, and each connector can be connected to the speaker at that temple through, for example, a conductor (e.g. a wire) in the temple. In one embodiment, the connectors are standard 2.5 or 3.5 mm male mono mini phone plugs. Such glasses can be used to listen to stereo music based on a mono-plugs-to-stereo-plug adapter cord. FIG. 23 shows one embodiment of the wiring connections of such an adapter cord 550. At one end of the adapter cord, there are two female mono mini phone plugs. These plugs are not shown in the figure. Each plug connects to two wires, one signal wire and the other the ground wire. For example, a first female plug includes signal wire 552 and ground wire 554; and the second female plug includes the signal wire 556 and ground wire 558. Each pair of wires can be embedded inside a cable, with both cables forming part of a lanyard. The other side of the cord 550 is a male stereo mini phone plug 560. Of the 3 connections at the male stereo mini phone plug 560, one can be connected to both of the ground wires 554 and 558, and for the other two, one to each signal wires 552 and 556. The male stereo plug 560 can be used to receive stereo signals for the two speakers, or can be used as a plug to receive a telephone call, similar to the stereo plugs at the temples shown in FIGS. 21A-21B. In this example, the male stereo plug is not at the glasses, but is external to the glasses, such as at the lanyard.

In the above examples on cords, the microphone, such as for a phone or for hearing enhancement, is external to the glasses. In other embodiments, the microphone is in the glasses. With the microphone in the glasses, in the embodiments shown in FIGS. 21A-21B, the plugs at the temple tips are five terminal plugs, with the five terminals being the positive or the signal terminal for the left speaker, the positive or the signal terminal for the right speaker, the ground for both speakers, the microphone and the ground for the microphone. In the embodiment shown in FIG. 21 A, the ground for the microphone 458 is connected to the positive terminal of the right speaker 462 at the g 462 terminal of the male stereo plug 456 within the plug 456. In the embodiment shown in FIG. 21 B, the grounds of speakers and the ground of the microphone are all connected together at the g 478 terminal of the male stereo plug 480.

With the microphone in the glasses, as for the embodiment shown in FIG. 23, the plugs at the temple tips are four terminal plugs, with the four terminals being the signal terminal for a speaker, the ground for the speaker, the signal terminal for a microphone and the ground for the microphone. The male stereo plug 560 is replaced by a five terminal plug, with the five terminals being the signal terminal for the left speaker, the signal terminal for the right speaker, the ground for both speakers, the signal terminal for the microphone and the ground for the microphone.

In the above examples of the glasses functioning as a headset, one microphone is described. However, there can be more than one microphone. As described, additional microphones can provide additional benefits. For example, two microphones can be used for noise cancellation purposes. In another example, two microphones can be for stereo reception purposes with one microphone on the left side and the other on the right side of the user. For users with significant hearing loss in one of the ears, signals received from that ear can be routed to the speaker in close vicinity to the other ear. In any event, if there are two microphones, with both microphones in the glasses, and if there is just one connector at the glasses, the connector can have six terminals. The six terminals can be for the signal terminal for each of the speakers and the signal terminals for the two microphones, the ground for both speakers, and the ground for both microphones. If there are two connectors at the glasses, one at each of the temple tips, again with the microphones in the glasses, the two connectors can be four terminal connectors. Each set of the four terminals includes the signal terminal of the microphone and the signal terminal for the speaker at that temple, and their separate grounds. In these embodiments with more than one microphone, again, one can use a combined cord that has a switch so that the glasses with the combined cord are applicable as a headset for, such as, a phone, a hearing booster and an audio player.

Figure 24:
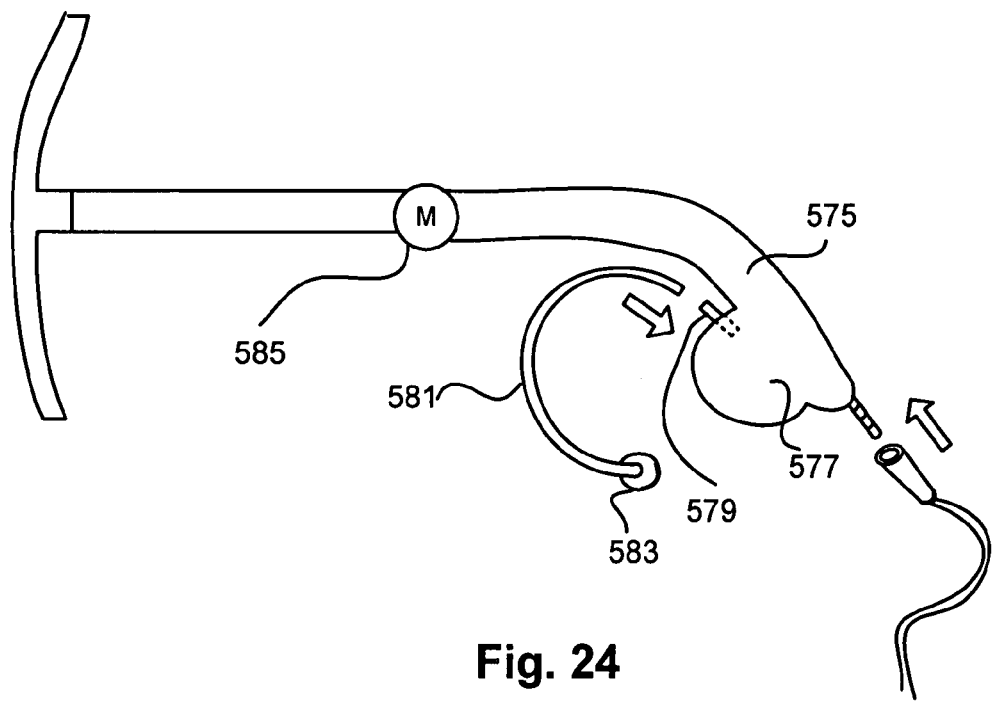
FIG. 24 shows an embodiment of the invention with a speaker at a temple tip with an extension for attachment to a tube.

Regarding the locations of the speakers, the speakers can be in the temples, similar to the embodiment shown in FIG. 1. In another embodiment, as shown in FIG. 24, a speaker 577 can be in one 575 of the temple tips.

In a number of embodiments, one or more speakers are embedded or partially embedded in the glasses. In one embodiment, instead of in the main body of the glasses, a speaker is, for example, at the end of a stub or an extension, extended from the main body of the glasses. The stub can extend from one of the temples of the glasses. There can be electrical wires inside the stubs to connect the speakers to other electrical component(s) in the main body of the glasses. The stubs can replace a number of the tube embodiments described by bringing the speakers closer to, or allowing the speakers to be inserted into, the ear canal of the user. In such embodiments, there may not be separate ear buds because the speakers themselves can be in structures that also serve as ear buds. Such ear buds with speakers can also be custom fitted into the ears of the user. Such ear buds can include venting structures to reduce to a certain degree the effects of occlusion.

In a number of embodiments with speakers embedded in the glasses, each speaker can have a tube extending towards an ear to guide the audio signals. The tubes can be permanently attached to the glasses. In another embodiment, the tubes are detachable from the glasses. There can be an extension 579 with a hole at the glasses for a speaker 577, as shown in FIG. 24. An external tube 581 can be attached to or inserted into the extension 579 for sound coupling into an ear. In the embodiment shown in FIG. 24, the external tube 581 extends from the back of an ear, over the top of the ear, and curls back towards the opening of the ear. Again, there can be an ear bud 583 at the end of the external tube 581 to further enhance sound coupling to an ear. Also, in this embodiment, a microphone 585 can be in the glasses at a position further away from the lens holders of the glasses.

Figure 25:
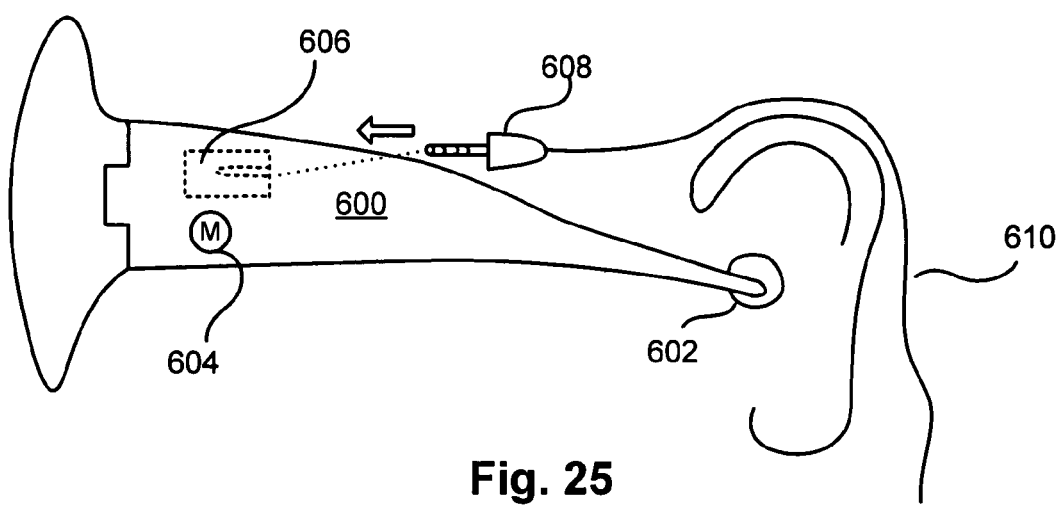
FIG. 25 shows an embodiment of the invention with the temples not extending behind the ears.

With ear buds in the ears, it may not be necessary to have temples extend behind the ears. FIG. 25 shows an embodiment with each of the free ends of the temples, such as the temple 600, having an ear bud 602. The speaker for the ear bud 602 can be in the structure of the ear bud 602. The speaker can be away from the ear bud, such as inside the temple 600 close to the hinge of the temple 600, but is audibly coupled to the ear bud. For example, the temple includes a tube or a tubular structure inside the temple 600 to guide the audio signals from the speaker to the ear bud 602 for the ear. In this embodiment, a microphone 604 can be located in one of the temples further away from the free end of that temple. The pair of glasses can also function as a headset. If the headset is connected to a portable device through a cord 610, the glasses include at least one connector to receive the cord 610. In one embodiment, the connector 606 at the glasses is a female connector. The cord 610 for the portable device ends with a male connector 608 to be inserted into female connector 606 at the glasses. When the glasses are worn, both ear buds are inserted into the ears of the users. Together with the bridge (directly or indirectly through the nose pads) on the nose, and the ear buds inserted into the ears of the user, the glasses can be stably held on the head of the user. In the embodiment of a wired headset with one connector, when worn, the cord 610 can drape behind one of the ears.

Regarding embodiments with ear buds at the free ends of the temples, in yet another embodiment, the ends of the temples are small and are made of soft materials. If the user chooses to wear such glasses, but does not want to use the speakers, the user has the option to comfortably wear the glasses with the ear buds positioned above his ears.

In one embodiment, the length of the tubes or the stubs is not fixed, but is adjustable. The tubes or the stubs are retractable and extendable, for example, similar to the embodiment shown in FIG. 3. The positions of the tubes or the stubs also can be changed, for example, similar to the embodiment shown in FIG. 2. Alternatively, the temples can be made of malleable materials to allow some adjustment to fit different users. Glasses with such flexibilities, if applied to the embodiments with ear buds at the free ends of the temples, are even easier to adjust to fit different users, for example, because one may only need to adjust the distance between the ear buds and the lens holders of the glasses.

Figure 26:
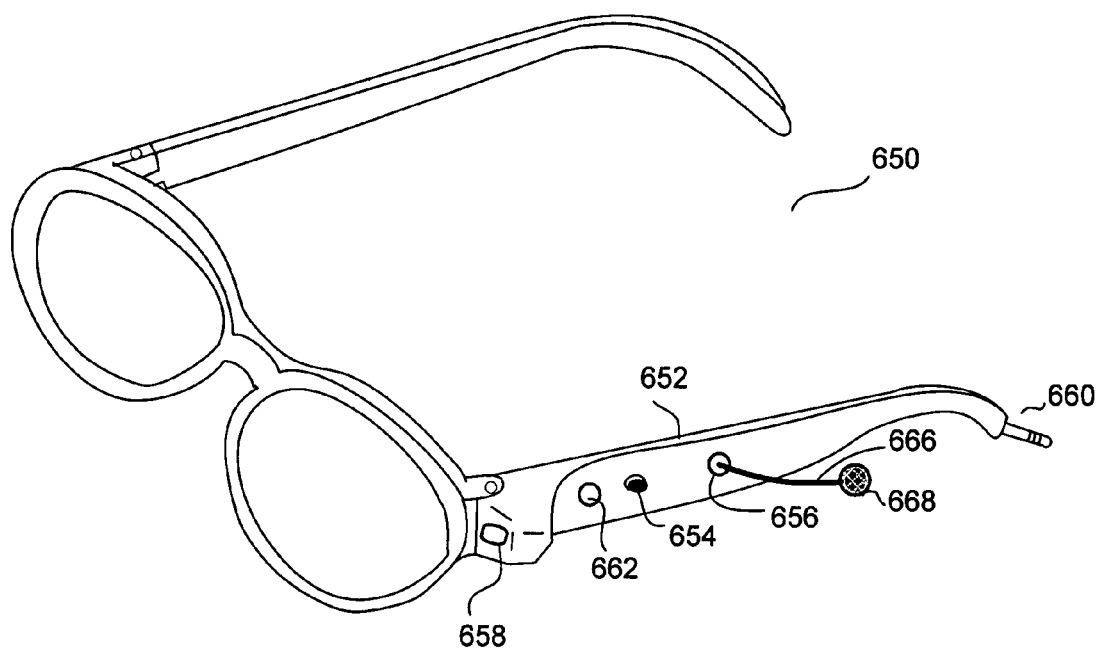
FIG. 26 shows an embodiment of the invention with a pair of eyeglasses functioning as a headset that has a camera, a microphone and a speaker.

In yet in another embodiment, a pair of glasses functioning as a headset with a speaker and a microphone further includes a camera, as shown in FIG. 26. The glasses 650 include a temple 652 that has a microphone 654, a speaker 656 and a camera 658 with a connector 660. The connector 660 is for connecting, for example, to a portable device that includes at least the power source for the glasses.

The camera 658 is preferably a digital camera with an on/off switch 662. For example, the camera 658 is a CCD camera with a CCD controller coupled to a CCD chip, a CCD memory device and a lens.

In one embodiment, with the connector 660 connected to the portable device, when the switch 662 is pushed on, the CCD chip takes a picture. The charges in the CCD chip are digitized and transmitted through the connector to the portable device, under the management of the controller. At least some of the charges can be temporarily stored in the CCD memory device, for example, to accommodate the differences in speed in taking pictures and sending the pictures to the portable device through the connector. In this embodiment, images are permanently stored at the portable device.

In one embodiment, the glasses do not offer focusing capability. The CCD chip can be located, for example, at the focal point of the lens. In another embodiment, there is an image distance control knob. For example, a mechanical lever can be pre-programmed or pre-set to move the lens to one or more different positions. There can be just two positions. One position can be for close-up shots and another for distance shots, such as close-up being about 2 ft from the lens and the distant being about 6 ft away; or close-up being about 8 inches away and distant being about 2 ft away.

FIG. 26 shows one embodiment regarding the location of the camera 658 at the end of the temple or arm 652 of the glasses next to the hinge of the temple. The lens of the camera faces forward. In this situation, what the user sees is substantially what the captured image would be. In other words, in a general sense, what the user sees through the glasses is what the user gets, without the need for an additional view finder. With such an embodiment, it is relatively easy for a user to take pictures, hands-free, without the need for an additional strap for holding the camera.

The connector 660 at the end of the glasses 650 can be, for example, a 4-terminal connector, one for ground, one for power and the other two for transmit and receive signals. In another embodiment, the connector 660 can be a 3-terminal connector, with the power line and one of the signal lines sharing one terminal.

Regarding the embodiment shown in FIG. 26, the speaker 656 can be in the glasses, with a tube 666 and an ear bud 668, to help bring audio signals to the user. In one embodiment, the tube 666 can be rotated at its end where it connects to the glasses.

In one embodiment, the CCD with the CCD memory device and the CCD controller are on the same integrated circuit.

The embodiment shown in FIG. 26 also includes a microphone 654. In one embodiment, the CCD memory device also stores audio signals from the microphone. For example, the memory device stores the last 15 seconds of audio signals. When the user takes a picture, the previous 15 seconds of audio signals can be coupled to the picture. The next 10 seconds of audio signals can also be coupled to the picture. The audio signals or the digitized version of the audio signals can also be transmitted to the portable device with the corresponding picture. In the future, if the user wants to view the picture, the audio signals can be played with the picture at the same time.

The electrical components in the portable device for the glasses with a camera can be incorporated in the glasses. For example, the power sources can also be in the glasses and the glasses do not have to include a connector. In one embodiment, the glasses include non-volatile memory to store at least a number of pictures. In another embodiment, the glasses further includes a connector to receive a memory card, such as a flash memory device. One embodiment of such a removable card on a pair of glasses is shown in FIG. 17, where the card 352 can be a removable memory card. The card can be a standard memory card with a USB connector. Pictures taken can be stored in the removable memory card.

In yet another embodiment for the glasses with a camera, the glasses do not include a speaker or a microphone. The glasses include a temple that has a CCD controller coupled to a CCD chip, a CCD memory device and a lens. The temple also includes an on/off switch with a connector. The connector is for connecting, for example, to a portable device that includes at least the power source for the camera.

Additional disclosure on camera in glasses can be found in U.S. Provisional Application No. 60/583,169, filed on Jun. 26, 2004, which is hereby incorporated by reference.

A number of electrical components have been described. They can be on circuit boards, which can be made of flexible materials. They can be on a substrate. They can also be integrated into one or more integrated circuits.

Although a number of embodiments have been described of glasses with hearing enhanced and/or other audio signal generation capabilities, in one embodiment, the hearing enhanced and/or other audio signal generation capabilities are in another apparatus. When a person is using that apparatus, a third party again would not be able to tell whether the person is having his hearing enhanced, or listening to other audio signals. This again may be able to remove the stigma of wearing a hearing aid.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

A number of embodiments in the invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An eyeglass frame for supporting lenses therein, the frame being configured to enhance the hearing of a user, who has at least mild hearing loss on at least one of the user's ears, comprising:
    a first temple and a second temple, one on each side of the frame;
    a first speaker connected to the first temple;
    a microphone fixed to the frame to receive audio signals; and
    at least one electrical component embedded in the frame that performs a hearing enhancement function to enhance the received audio signals from the microphone to be sent to the first speaker for the user to hear,
    wherein the hearing enhancement function includes amplifying a predetermined frequency range of the received audio signals from the microphone so as to compensate for the user's hearing loss, and
    wherein the frame belongs to a plurality of frames, each of the plurality of frames being preset to compensate for different hearing profile to allow different users to select any of the frames to beat compensate for their hearing loss.

2. An eyeglass frame as recited in claim 1,
    wherein each temple has two ends, a forward end and a backward end, with the forward end of each temple being secured to the frame, and each temple also has a middle portion in between its forward end and its backward end, and
    wherein the frame further comprises:
        a second speaker proximate to the backward end or the middle portion of the second temple; and
        another microphone fixed to the frame, separate from the speakers and proximate to the forward end of the second temple, to receive audio signals.

3. An eyeglass frame as recited in claim 2, wherein the microphones are directional, one favoring audio signals from the left and the other from the right when the frame is worn by the user.

4. An eyeglass frame as recited in claim 3, wherein the amplification of the predetermined frequency range is configured to be automatically changed depending on a power level related to the received audio signals.

5. An eyeglass frame as recited in claim 4 further comprising:
    at least another electrical component embedded in the frame configured to support generating other audio signals by the first speaker, with the other audio signals not originating from the audio signals captured by the microphone but from a stored audio file; and
    at least a mechanical control mechanism at one of the temples with the control mechanism configured to allow the user to control an operation regarding the other audio signals,
    wherein the frame can be used separately to enhance the hearing of the user and to allow the user to hear from the other audio signals, and
    wherein the at least one electrical component can also be configured to perform the hearing enhancement function to enhance the other audio signals so as to compensate for the hearing loss of the user.

6. An eyeglass frame as recited in claim 5, wherein the frame is configured to electronically keep track of a preference of the user regarding the other audio signals.

7. An eyeglass frame as recited in claim 6, wherein the audio file is stored in a MP3 player.

8. An eyeglass frame as recited in claim 4, further comprising:
    at least another electrical component embedded in the frame configured to support generating other audio signals by the first speaker, with the other audio signals not originating from the audio signals captured by the microphone but from a wireless signal transmitted by a device and received by the frame; and
    at least a mechanical control mechanism at one of the temples with the control mechanism configured to allow the user to control an operation regarding the other audio signals,
    wherein the frame can be used separately to enhance the hearing of the user and to allow the user to hear from the other audio signals, and
    wherein the at least one electrical component can also be configured to perform the hearing enhancement function to enhance the other audio signals so as to compensate for the hearing loss of the user.

9. An eyeglass frame as recited in claim 1 wherein the amplification of the predetermined frequency range is configured to be automatically changed depending on a power level related to the received audio signals.

10. An eyeglass frame as recited in claim 1 further comprising a rechargeable power source at least partially embedded in at least one of the temples of the frame.

11. An eyeglass frame as recited in claim 1,
    wherein each temple has two ends, a forward end and a backward end, with the forward end of each temple being secured to the frame, and each temple also has a middle portion in between its forward end and its backward end,
    wherein the first speaker is proximate to the backward end or the middle portion of the first temple, and wherein the microphone is fixed to the frame, separate from the first speaker, proximate to the forward end of the first temple.

12. An eyeglass frame as recited in claim 1, wherein the microphone is directional, favoring audio signals from either the left or the right side of the frame when the frame is worn.

13. An eyeglass frame as recited in claim 1 further comprising:
- at least another electrical component embedded in the frame configured to support generating other audio signals by the first speaker, with the other audio signals not originating from the audio signals captured by the microphone but from a stored audio file; and
- at least a mechanical control mechanism at one of the temples with the control mechanism configured to allow the user to control an operation regarding the other audio signals,
- wherein the frame can be used separately to enhance the hearing of the user and to allow the user to hear from the other audio signals.

14. An eyeglass frame as recited in claim 13, wherein the at least one electrical component is also configured to perform the hearing enhancement function to enhance the other audio signals so as to compensate for the hearing loss of the user.

15. An eyeglass frame as recited in claim 14, wherein the audio file is configured to be stored in a multimedia asset player.

16. An eyeglass frame as recited in claim 15, wherein the audio file is stored in a MP3 player.

17. An eyeglass frame as recited in claim 15, wherein the multimedia asset player is configured to keep track of a preference of the user regarding the other audio signals.

18. An eyeglass frame as recited in claim 1 further comprising:
- at least another electrical component embedded in the frame configured to support generating other audio signals by the first speaker, with the other audio signals not originating from the audio signals captured by the microphone but from a wireless signal transmitted by a device and received by the frame; and
- at least a mechanical control mechanism at one of the temples with the control mechanism configured to allow the user to control an operation regarding the other audio signals,
- wherein the frame can be used separately to enhance the hearing of the user and to allow the user to hear from the other audio signals.

19. An eyeglass frame as recited in claim 18, wherein the at least one electrical component is also configured to perform the hearing enhancement function to enhance the other audio signals so as to compensate for the hearing loss of the user.

20. An eyeglass frame as recited in claim 18, wherein the frame is configured to electronically keep track of a preference of the user regarding the other audio signals.

\* \* \* \* \*

UNITED STATES PATENT AND TRADEMARK OFFICE
CERTIFICATE OF CORRECTION

| | | |
|---|---|---|
| PATENT NO. | : 7,760,898 B2 | Page 1 of 1 |
| APPLICATION NO. | : 11/183262 | |
| DATED | : July 20, 2010 | |
| INVENTOR(S) | : Howell et al. | |

It is certified that error appears in the above-identified patent and that said Letters Patent is hereby corrected as shown below:

Title Page:

In Section (56) References Cited, Page 3, under Other Publications

"Camoy, David, "The Ultimate MP3Player for Athletes? Could be.", CNET Reviews, May 14, 2004, pp. 1-4." should be --Carnoy, David, "The Ultimate MP3Player for Athletes? Could be.", CNET Reviews, May 14, 2004, pp. 1-4.--.

In The Claims:

Column 29, line 53 (claim 1, lines 19-20) "for different" should be --for a different--.

Column 29, line 54 (claim 1, line 21) "beat compensate" should be --best compensate--.

Signed and Sealed this

Twenty-first Day of December, 2010

David J. Kappos
*Director of the United States Patent and Trademark Office*